US012753879B2

(12) United States Patent
Kioschis et al.

(10) Patent No.: US 12,753,879 B2
(45) Date of Patent: Oct. 6, 2026

(54) COMPRESSED-GAS STORAGE CONTAINER AND VEHICLE

(71) Applicant: Rheinmetall Invent GmbH, Neuss (DE)

(72) Inventors: Kai Kioschis, Morlheim (DE); Michael Lutz, Dusseldorf (DE); Carmelo Veneziano, Untereisesheim (DE); Karl-Heinz Hassel, Ostringen (DE)

(73) Assignee: Rheinmetall Invent GmbH, Neuss (DE)

( * ) Notice: Subject to any disclaimer, the term of this patent is extended or adjusted under 35 U.S.C. 154(b) by 0 days.

(21) Appl. No.: 18/710,856

(22) PCT Filed: Oct. 19, 2022

(86) PCT No.: PCT/EP2022/079012

§ 371 (c)(1),
(2) Date: May 16, 2024

(87) PCT Pub. No.: WO2023/088626

PCT Pub. Date: May 25, 2023

(65) Prior Publication Data

US 2025/0052369 A1 Feb. 13, 2025

(30) Foreign Application Priority Data

Nov. 18, 2021 (DE) ..................... 10 2021 130 204.8

(51) Int. Cl.
*F17C 1/00* (2006.01)
*F17C 13/00* (2006.01)

(52) U.S. Cl.
CPC ............ *F17C 1/005* (2013.01); *F17C 13/002* (2013.01); *F17C 2201/0109* (2013.01);
(Continued)

(58) Field of Classification Search
CPC ...... F17C 1/005; F17C 13/002; F17C 13/001; F17C 13/04; F17C 2227/0337;
(Continued)

(56) References Cited

U.S. PATENT DOCUMENTS 3,433,382 A * 3/1969 Boggio .................. B21D 51/24 220/660
9,170,072 B1 10/2015 Riggs
(Continued)

FOREIGN PATENT DOCUMENTS

DE 35 44 217 A1 6/1987
DE 103 56 852 A1 7/2004
(Continued)

*Primary Examiner* — Robert Poon

(74) *Attorney, Agent, or Firm* — Young Basile Hanlon & MacFarlane, P.C.

(57) ABSTRACT

Disclosed is a compressed-gas storage container for the pressurized storage of hydrogen gas including a wall defining a receiving area for storage of the gas. A gas-guiding device directs at least part of the gas along the inside of the wall wherein the wall acts as a heat exchanger in order to remove heat from the gas as the receiving area is being filled with the gas and to dissipate said heat to surroundings exterior to the gas storage container.

19 Claims, 14 Drawing Sheets

(52) U.S. Cl.
CPC .... *F17C 2201/035* (2013.01); *F17C 2203/00* (2013.01); *F17C 2221/012* (2013.01); *F17C 2227/0337* (2013.01); *F17C 2265/066* (2013.01); *F17C 2270/0178* (2013.01)

(58) Field of Classification Search
CPC ................ F17C 2227/0344; F17C 1/12; F17C 2203/0375; F17C 2205/0302; F17C 2205/035; F17C 2205/0338; F17C 5/06
USPC ........ 220/581, 584, 585, 587, 601, 586, 592
See application file for complete search history.

(56) References Cited

U.S. PATENT DOCUMENTS

| | | | | |
|---|---|---|---|---|
| 11,473,728 | B2 | 10/2022 | Kraus et al. | |
| 2015/0300784 | A1 | 10/2015 | Scarinci et al. | |
| 2016/0061381 | A1* | 3/2016 | Kotliar | B23K 15/0093 219/76.12 |
| 2020/0284396 | A1* | 9/2020 | Kraus | F17C 5/06 |
| 2021/0041065 | A1 | 2/2021 | Jayaraman et al. | |

FOREIGN PATENT DOCUMENTS

| | | | |
|---|---|---|---|
| DE | 10 2011 013 570 | A1 | 11/2011 |
| DE | 10 2017 206 346 | A1 | 10/2018 |
| DE | 10 2017 220 598 | A1 | 5/2019 |
| DE | 10 2019 203 258 | A1 | 9/2020 |
| DE | 10 2020 117 910 | A1 | 1/2022 |
| DE | 10 2020 117 916 | A1 | 1/2022 |
| FR | 2 935 774 | A1 | 3/2010 |
| JP | 2007298051 | A | 11/2007 |
| JP | 4474868 | B2 | 6/2010 |
| WO | 2009/007972 | A2 | 1/2009 |
| WO | 2016004033 | A2 | 1/2016 |
| WO | 2019096582 | A1 | 5/2019 |

* cited by examiner

COMPRESSED-GAS STORAGE CONTAINER AND VEHICLE

CROSS-REFERENCE TO RELATED APPLICATION(S)

This application is filed pursuant to 35 U.S.C. § 371 claiming priority benefit to PCT/EP2022/079012 application filed Oct. 19, 2022, which claims priority benefit to Ger-man Patent Application No. DE 102021130204.8 filed Nov. 18, 2021, the contents of both applications are incorporated herein by reference in their entirety for all purposes.

TECHNICAL FIELD

The present invention relates to a pressurized-gas storage container for pressurized storage of a gas and to a vehicle comprising such a pressurized-gas storage container.

BACKGROUND

To store and transport hydrogen, it can either be stored in gaseous form in a pressurized-gas storage container under several 100 bar overpressure or in liquid form at cryogenic temperatures. For use in or on vehicles, in particular in or on passenger cars, it is advantageous for reasons of space to store the hydrogen in gaseous form in a pressurized-gas storage container as mentioned above.

During the filling of such a pressurized-gas storage container, the hydrogen is expanded into the pressurized-gas storage container under high pressure. This causes the hydrogen to heat up and expand. This makes further filling more difficult and can have the conse-quence that the time for filling the pressurized-gas storage container must be selected suffi-ciently long in order to compensate for an uneven temperature distribution within the pressur-ized-gas storage container and to dissipate heat to the surroundings of the pressurized-gas storage container.

SUMMARY

Against this background, one task of the present invention is to provide an improved pressurized-gas storage container.

Accordingly, a pressurized-gas storage container for pressurized storage of a gas, in particular hydrogen, is proposed. The pressurized-gas storage container comprises a wall enclosing a receiving area for receiving the gas, and a gas guide apparatus, which guides at least part of the gas along an inner side of the wall during filling of the receiving area with the gas, wherein the wall acts as a heat exchanger in order to extract heat from the gas during the filling of the receiving area with the gas and to release it to a surroundings of the pressurized-gas storage container.

Because the gas guide apparatus is provided and the wall acts as a heat exchanger, it is advantageously possible to dissipate heat to the surroundings while the receiving area is being filled. This reduces the heat input into the gas contained in the receiving area. This makes it possible to reduce the time required to fill the receiving area.

The pressurized-gas storage container may also be referred to as a pressurized gas tank, hydrogen tank, hydrogen storage container or the like. In particular, the pressurized-gas storage container is suitable for storing and/or transporting hydrogen. However, any other gases can also be stored in the pressurized-gas storage container. In the following, it is assumed that the gas is hydrogen. The terms "gas" and "hydrogen" can therefore be used interchangeably. The entire gas to be filled into the receiving area can also be guided along the inner side of the wall.

In the present case, the term "pressurized-gas storage container" means that the gas can be stored in its gaseous aggregate state under pressure in the pressurized-gas storage container. For example, the gas can be pressurized to a pressure of 800 to 1,000 bar. Liquefaction of the gas is not provided for in the present case. The gas is introduced or injected into the receiving area in gaseous form.

The pressurized-gas storage container is preferably part of a vehicle. The vehicle may comprise several such pressurized-gas storage containers. The pressurized-gas storage container may be suitable for providing the gas to a consumer, in particular a fuel cell, of the vehicle at a suitable supply pressure and a suitable supply temperature. The pressurized-gas storage container may be part of a gas supply system or hydrogen supply system of the consumer. However, the pressurized-gas storage container can also be used in immobile applications, for example in building services. In particular, the pressurized-gas storage container can be used in the field of building heating or for combined heat and power plants.

The wall preferably comprises a load-bearing jacket, at least sections of which are made of a fiber composite plastic. The jacket encloses a liner. The liner is arranged inside the jacket. The jacket thus completely encapsulates the liner. The liner is preferably gas tight. The liner can also be referred to as a lining. The liner may comprise a plastic material, a metallic material and/or a fiber composite plastic.

The pressurized-gas storage container and thus also the wall is preferably cylindrical. The pressurized-gas storage container or the wall is assigned a symmetry or middle axis to which the pressurized-gas storage container or the wall is rotationally symmetrical. The wall preferably comprises a hollow cylindrical or tubular basic section, which is closed on both sides by lid-shaped or dome-shaped wall end sections. The jacket and the liner are provided both in the area of the basic section and in the area of the wall end sections.

The fact that the wall "encloses" or "limits" the receiving area means in particular that the wall defines a geometry or limits of the receiving area. The gas is thus contained within the wall in the receiving area. In particular, the receiving area is a cavity enclosed by the wall. The receiving area comprises a cylindrical geometry. The receiving area is sealed off from the surroundings in a gas-tight manner by means of the wall.

The gas guide apparatus may also be referred to as a gas diverter. The gas guide apparatus may comprise any number of internals, components, bores, channels, cooling canals, diverter elements, fins, plates, heat dissipation elements or the like. In particular, the gas guide apparatus itself may be suitable for extracting heat from the gas received in the receiving area and dissipating it to the surroundings. Therefore, the gas guide apparatus may also be referred to as a gas guide and cooling apparatus.

The gas guide apparatus can cool the gas actively or passively. "Passive" can mean in particular that no additional working media, such as a coolant or refrigerant, and/or external energy is used to dissipate the heat. In particular, with passive cooling, heat is preferably dissipated via heat conduction and heat radiation. In the present case, "cooling" is generally understood to mean that heat is dissipated.

In contrast, in an "active" cooling process, the heat is dissipated with the help of an additional working medium, for example in the form of a coolant or a refrigerant. A coolant circuit or a refrigerant circuit with a pump can be provided for this purpose. However, an "active" cooling process can also be understood to mean that the gas contained in the receiving area is itself used to flow through an optional cooling canal of the pressurized-gas storage container.

In this case, "inner side" means facing the receiving area. This means that during filling of the receiving area with the gas, the gas guide apparatus removes a portion of the gas filled into the receiving area and preferably guides it along the wall from the first wall end section towards the second wall end section in a gas stream that abuts against the wall.

In particular, the wall is directly adjacent to the surroundings. So that the wall can act as a heat exchanger, it can, for example, comprise materials with good thermal conductivity, in particular metallic materials. The gas guide apparatus and the wall interact functionally in such a way that the gas guide apparatus guides the gas as closely as possible along the wall and for as long as possible along the wall, whereas the wall itself absorbs heat from the gas by supplying the gas directly along it. This heat is preferably transferred from the wall to the surroundings by means of heat conduction.

According to an embodiment, the wall is assigned a middle axis, wherein the gas guide apparatus guides the gas along the middle axis from a first wall end section of the wall toward a second wall end section of the wall facing away from the first wall end section during the filling of the receiving area.

As previously mentioned, the wall or the pressurized-gas storage container is rotationally symmetrical to the middle axis. The wall preferably comprises an annular or hollow cylindrical geometry in cross-section. However, this does not exclude the possibility that the wall may also be at least partially oval in cross-section. Preferably, the gas guide apparatus guides the gas along the middle axis or along a longitudinal direction of the pressurized-gas storage container away from the first wall end section in the direction of the second wall end section.

According to another embodiment, the gas guide apparatus comprises a first gas guide element which is arranged within the receiving area, wherein the first gas guide element is fitted in or on an inlet nozzle, which opens into the first wall end section for supplying the gas into the receiving area.

The first gas guide element can also be referred to generally as a gas guide element or gas diverter element. The inlet nozzle can also be referred to as an injection nozzle. In particular, the inlet nozzle is part of the pressurized-gas storage container. With the help of the inlet nozzle, it is possible to fill the receiving area with the gas. The gas guide apparatus can comprise any number of different gas guide elements. The inlet nozzle is preferably arranged in such a way that it is rotationally symmetrical to the middle axis of the pressurized-gas storage container. In particular, this means that the inlet nozzle is preferably arranged centrally on the first wall end section. The inlet nozzle can be guided from the surroundings to the receiving area both through the jacket and through the liner. The first gas guide element can protrude at least in sections into the inlet nozzle. This means that the first gas guide element, in particular a tip of the first gas guide element, is arranged at least in sections within the inlet nozzle. Alternatively, the first gas guide element can also be arranged at a distance from the inlet nozzle when viewed along the longitudinal direction. The longitudinal direction is oriented from the first wall end section in the direction of the second wall end section.

According to a particularly preferred further embodiment, a pressurized-gas storage container for pressurized storage of a gas, in particular hydrogen, is proposed. The pressurized-gas storage container comprises a wall which encloses a receiving area for receiving the gas, an inlet nozzle opening into the receiving area for supplying the gas into the receiving area, and a gas guide apparatus, which guides at least part of the gas along the inner side of the wall during filling of the receiving area with the gas, wherein the gas guide apparatus comprises a gas guide element which is mounted in or on the inlet nozzle and is configured to guide the part of the gas to be guided along the wall on the inner side in a radial direction outwards away from the inlet nozzle towards the wall, wherein the wall acts as a heat exchanger in order to extract heat from the gas during the filling of the receiving area with the gas and to release it to the surroundings of the pressurized-gas storage container. The radial direction is preferably oriented perpendicular to the aforementioned middle axis of the wall. The radial direction points away from the middle axis towards an inner side of the wall facing the receiving area.

According to another embodiment, the first gas guide element is conical at least in sections, wherein a cross-section of the first gas guide element widens starting from the inlet nozzle in the direction of the second wall end section.

In particular, the cross-section of the first gas guide element expands starting from the first wall end section in the direction of the second wall end section. In the present case, "wid-ening" means in particular that the cross-section or a cross-sectional area of the first gas guide element becomes continuously larger starting from the inlet nozzle in the direction of the second wall end section. The gas guide element is preferably rotationally symmetrical to a symmetry or middle axis. This middle axis of the first gas guide element is preferably arranged coaxially to the middle axis of the pressurized-gas storage container. The first gas guide element can be conical, or cone shaped. In principle, however, the first gas guide element can also comprise any other geometry. In the event that the gas guide element is conical or cone-shaped, it can comprise a tapered tip that faces the inlet nozzle and an end face that faces away from the inlet nozzle. When the gas is admitted into the receiving area, the gas strikes a conical or cone-shaped jacket surface, whereby the gas is diverted outwards along the radial direction away from the axis of symmetry of the pressurized-gas storage container towards the wall and is guided along the wall from the first wall end section towards the second wall end section. The jacket surface extends from the tip to the end surface of the first gas guide element. In particular, the gas is aerated onto the center of the tip of the first gas guide element.

According to another embodiment, the first gas guide element covers the inlet nozzle at least in sections.

In particular, the first gas guide element covers the inlet nozzle when viewed from the end face of the first gas guide element. The first gas guide element can also cover the inlet nozzle only partially or in sections. In this case, the first gas guide element only partially protrudes into a gas stream generated by the inlet nozzle.

According to another embodiment, the first gas guide element is mounted centrally or eccentrically in or on the inlet nozzle.

"Centered" in the present case means that the middle axis of the first gas guide element and the middle axis of the pressurized-gas storage container or the wall are arranged coaxially to one another. "Eccentrically" in the present case means that the middle axis of the first gas guide element and the middle axis of the pressurized-gas storage container or the wall are not arranged coaxially to one another. In particular, this means that the aforementioned middle axes are spaced apart or offset from each other.

According to another embodiment, the gas guide apparatus comprises a second gas guide element which differs from the first gas guide element, wherein the second gas guide element is attached to the second wall end section.

The fact that the second gas guide element "differs" from the first gas guide element means in particular that the first gas guide element and the second gas guide element are two separate components or parts and are not identical to one another. The first gas guide element is preferably provided at the first wall end section. Accordingly, the second gas guide element is preferably provided at the second wall end section. The first gas guide element and the second gas guide element are thus placed at a maximum distance from each other when viewed along the longitudinal direction. Like the first gas guide element, the second gas guide element is preferably positioned within the receiving area.

According to another embodiment, the second gas guide element is configured to guide the part of the gas that is guided along the inner side of the wall back along the middle axis in the direction of the first gas guide element.

When filling the receiving area, the area of the wall that is furthest away from the inlet nozzle is preferably heated the most. In this case, this is the second wall end section. With the help of the second gas guide element, it is thus possible to dissipate heat from the second wall end section with the help of the gas deflected by the second gas guide element. The first gas guide element thus generates a jacket-shaped gas stream flowing along the wall from the first wall end section in the direction of the second wall end section, with the second gas guide element diverting the gas stream and supplying it back in the direction of the first wall end section as a counter gas stream. The second gas guide element thus generates a counter gas stream flowing in the opposite direction to the gas stream generated by the first gas guide element. The counter gas stream preferably runs within the gas stream generated by the first gas guide element. The first gas stream is thus in the shape of a jacket and circulates around the counter gas stream. However, this is optional.

According to another embodiment, the second gas guide element is conical at least in sections.

In particular, the second gas guide element is rotationally symmetrical to a symmetry or middle axis. This middle axis of the second gas guide element is preferably arranged coaxially to the middle axis of the pressurized-gas storage container or the wall. For example, the second gas guide element can be bonded to the second wall end section of the wall.

According to another embodiment, the gas guide apparatus comprises at least one gas guide rib, which is arranged within the receiving area and extends along the middle axis.

In the event that the aforementioned gas guide tube is provided, the gas guide tube can be supported by the gas guide rib or the gas guide ribs and held centrally in the receiving area. For example, four gas guide ribs are provided, which lower part the gas guide canal provided between the gas guide tube and the wall into four gas guide canals. The gas guide ribs extend from the first wall end section in the direction of the second wall end section.

According to another embodiment, the gas guide apparatus comprises a gas guide tube which is arranged within the receiving area and is placed coaxially with the wall, so that at least one gas guide canal is provided between the gas guide tube and the wall.

The gas guide canal is hollow cylindrical and runs completely around the circumference of the gas guide tube. Preferably, the gas flows in this gas guide canal provided between the gas guide tube and the wall from the first wall end section in the direction of the second wall end section. From the second wall end section, the gas can be guided back to the first wall end section within the gas guide tube, for example with the aid of the aforementioned second gas guide element. A flow direction of the gas within the gas guide tube is thus oriented in the opposite direction to a flow direction of the gas within the gas guide canal.

According to another embodiment, the gas guide apparatus itself forms a thermal bridge between the receiving area and the surroundings in order to extract heat from the gas and release it to the surroundings.

The gas guide apparatus can comprise a heat discharge element for this purpose. The heat discharge element can be a lance or the like, which projects into the receiving area. The heat discharge element can also project out of the pressurized-gas storage container into the surroundings, at least in sections. This allows the heat discharge element to release heat into the surroundings. The heat discharge element is guided through the wall for this purpose. The heat discharge element can also be a so-called heat pipe. In the present case, a "heat pipe" is a heat exchanger that allows a high heat flow density by using the enthalpy of vaporization of a working medium. For this purpose, the heat discharge element comprises a heating zone that protrudes into the receiving area. In the heating zone, the working medium contained in the heat discharge element is vaporized, which is then conducted inside the heat discharge element to the surroundings. The working medium condenses again on a cooling zone of the heat discharge element that protrudes into the surroundings, whereby heat is released into the envi-ronment. In this case, the function of a "thermal bridge" means that the gas guide apparatus is suitable for removing heat from the receiving area and releasing it into the surroundings.

According to another embodiment, the gas guide apparatus comprises a cooling canal which is provided in or on the wall and through which at least part of the gas can flow while the receiving area is being filled with the gas.

This advantageously eliminates the need for an additional medium for cooling the pressurized-gas storage container. The cooling canal can run spirally around the wall and preferably extends from the first wall end section to the second wall end section. For example, the cooling canal runs helically around the wall. Any number of cooling canals can be provided. The cooling canal can be incorporated directly into the wall. Alternatively, the cooling canal can also be attached to the inner side or outer side of the wall. In this case, "inner side" means that the cooling canal protrudes into the receiving area. "Outer side" means that the cooling canal protrudes into the surroundings. The cooling canal can be provided in the jacket of the wall and/or in the liner of the wall. As an alternative to flowing the gas to be accommodated in the receiving area through the cooling canal, it is also possible to use any other coolant or refrigerant. In this case, the gas guide apparatus comprises, in particular, a cooling canal provided in or on the wall, through which a coolant or refrigerant can preferably flow during filling of the receiving area. For example, the cooling canal is part of a refrigerant circuit, which in particular comprises a thermo module, the cooling canal and supply and/or discharge lines.

The supply and/or discharge lines are preferably in fluid connection with the cooling canal. The thermo module may be an air conditioning system or automatic air conditioning system of the vehicle or may be referred to as an air conditioning system or automatic air conditioning system. For example, R1234yf (2,3,3,3-tetrafluoropropene) or R744 (carbon dioxide) can be used as the refrigerant that is fed through the cooling canal. Alternatively, R290 (propane) can also be used. The thermo module is preferably configured to air-condition a vehicle interior. In addition, the thermo module can also dissipate heat from the pressurized-gas storage container. The thermo module can therefore comprise a dual function. The thermo module or the refrigerant circuit can comprise a compressor for compressing the refrigerant. The refrigerant extracts heat from the receiving area as it flows through the cooling canal. The refrigerant can at least partially evaporate in the process. The cooling canal itself or the wall of the pressurized-gas storage container can therefore act as an evaporator for the refrigerant circuit. The thermo module or the refrigerant circuit can also include a condenser for condensing the refrigerant. The condenser is suitable for releasing heat. For example, the condenser can release the heat to the surroundings or to the vehicle interior. The thermo module can comprise a heat pump. Water, in particular cooling water, glycol or various brines can be used as coolants, for example. In this case, the cooling canal can be part of a cooling circuit. The cooling circuit can comprise a pump, in particular a water pump, in addition to the cooling canal. For example, cooling water can flow through the cooling canal to cool or dissipate heat. The cooling water can be pumped through the cooling canal, for example.

According to another embodiment, the cooling canal is configured to expand the part of the gas flowing through the cooling canal into the receiving area.

A nozzle, valve or similar can be provided for this purpose. For example, the cooling canal opens directly into the receiving area.

Furthermore, a vehicle, in particular a motor vehicle, comprising at least one such pressurized-gas storage container is proposed.

The vehicle can comprise several pressurized-gas storage containers of this type. The pressurized-gas storage container can, for example, be arranged in the area of a bottom of the vehicle. The vehicle can comprise a consumer, in particular a fuel cell, which is supplied with the gas using the pressurized-gas storage container. In particular, the vehicle can be an electric vehicle or a hybrid vehicle. However, the vehicle can also comprise an internal combustion engine. The vehicle can also be a commercial vehicle, for example a truck. Furthermore, the vehicle can also be an aircraft, a watercraft or a rail vehicle. The vehicle is particularly preferably a passenger car. The vehicle can comprise a thermo module or a refrigerant circuit as mentioned above. The thermo module can be part of an air conditioning system, in particular an automatic air conditioning system, of the vehicle. Furthermore, the thermo module itself can also be an air conditioning system or automatic air conditioning system of the vehicle. The thermo module is particularly suitable for air conditioning the vehicle interior.

The embodiments and features described for the proposed pressurized-gas storage container apply mutatis mutandis to the proposed vehicle and vice versa.

In this case, "one" is not necessarily to be understood as being limited to exactly one element. Rather, several elements, such as two, three or more, can also be provided. Any other counting word used here is also not to be understood as meaning that there is a restriction to exactly the specified number of elements. Rather, numerical deviations upwards and down-wards are possible, unless otherwise stated.

Other possible implementations of the pressurized-gas storage container and/or the vehicle also include combinations of features or embodiments described above or below with regard to the embodiment examples that are not explicitly mentioned. In this context, the per-son skilled in the art will also add individual aspects as improvements or additions to the re-spective basic form of the pressurized-gas storage container and/or the vehicle.

Further advantageous embodiments and aspects of the pressurized-gas storage container and/or the vehicle are the subject of the subclaims and of the embodiments of the pres-surized-gas storage container and/or the vehicle described below. Furthermore, the pressurized-gas storage container and/or the vehicle are explained in more detail by means of preferred embodiments with reference to the attached figures.

BRIEF DESCRIPTION OF THE DRAWINGS

In the figures, identical or functionally identical elements have been given the same reference symbols, unless otherwise stated.

DETAILED DESCRIPTION

Figure 1:
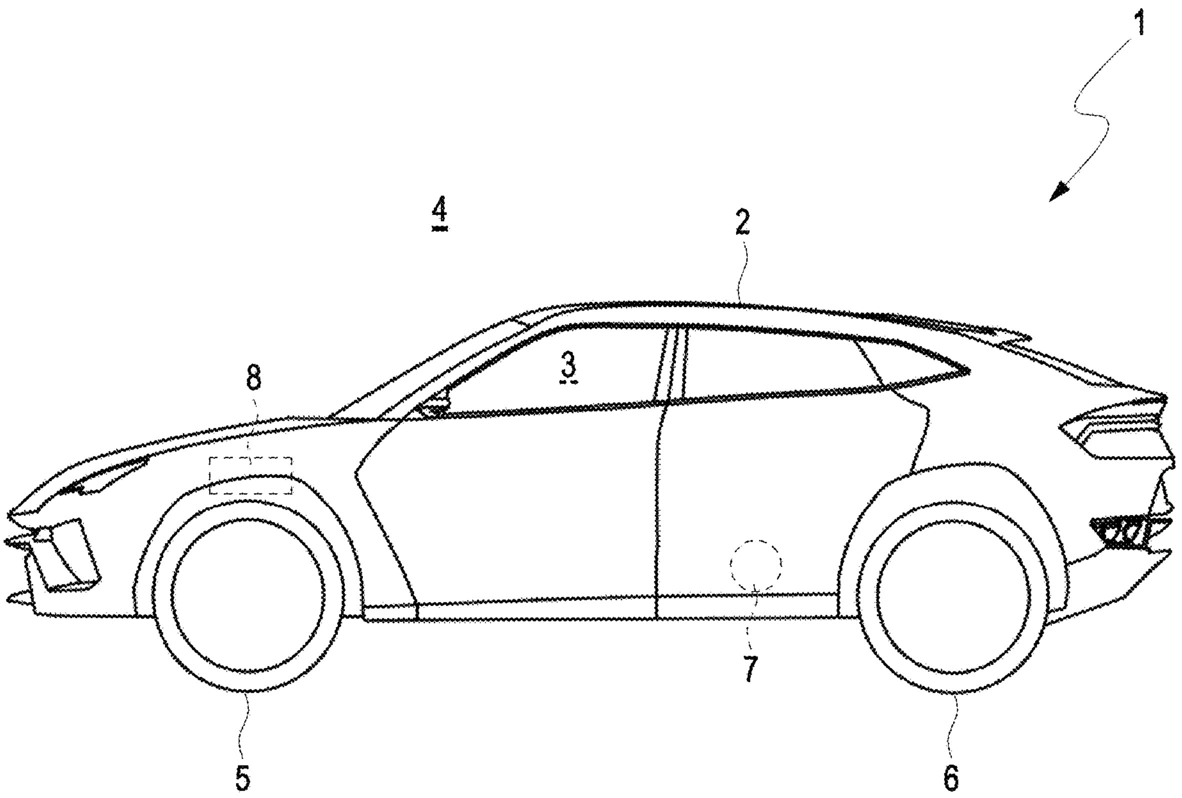
FIG. 1 shows a schematic side view of one embodiment of a vehicle.

FIG. 1 shows a schematic side view of an embodiment of a vehicle 1. The vehicle 1 is a motor vehicle, in particular an electric vehicle or a hybrid vehicle. However, the vehicle 1 can also be powered by an internal combustion engine. The vehicle 1 can also be a commercial vehicle, for example a truck, a harvesting machine or a construction machine. Furthermore, the vehicle 1 can also be a military vehicle. In addition, the vehicle 1 can also be an aircraft, a watercraft or a rail vehicle. In the following, however, it is assumed that the vehicle 1 is a motor vehicle, in particular a passenger car.

The vehicle 1 comprises a car body 2 which encloses a passenger compartment or vehicle interior 3 of the vehicle 1. The vehicle interior 3 can accommodate a driver and passengers. The car body 2 delimits a surroundings 4 of the vehicle 1 from the vehicle interior 3. The vehicle interior 3 is accessible from the surroundings 4 by means of doors.

The vehicle 1 comprises a chassis with several wheels 5, 6. The number of wheels 5, 6 is basically arbitrary. Preferably, the vehicle 1 comprises four wheels 5, 6. However, the vehicle 1 may also comprise six wheels 5, 6, for example. The wheels 5, 6 are part of a chassis of the vehicle 1. Only two wheels 5, 6 can be driven. However, all wheels 5, 6 can also be driven. In this case, the vehicle 1 is a four-wheel drive vehicle.

The vehicle 1 comprises a pressurized-gas storage container 7 for pressurized storage of a gas, in particular hydrogen. The pressurized gas storage container 7 is preferably placed on or in the area of a bottom or a floor structure of the vehicle 1. The pressurized-gas storage container 7 may be arranged outside the car body 2. The vehicle 1 may comprise a plurality of pressurized-gas storage containers 7.

In principle, the pressurized-gas storage container 7 is not only suitable for use on a vehicle 1, but can also be used for any other application, for example. For example, the pressurized-gas storage container 7 can also be used for immobile applications, in particular in building technology or for an emergency power supply. Furthermore, the pressurized-gas storage container 7 can be used in the field of building heating or for combined heat and power plants. In the following, however, it is assumed that the pressurized-gas storage container 7 is used for a mobile application, namely in or on the vehicle 1.

The pressurized-gas storage container 7 can be used to supply a consumer 8 of the vehicle 1 with the gas stored in the pressurized-gas storage container 7 at a suitable supply pressure and a suitable supply temperature. The consumer 8 is preferably a fuel cell. In the present case, a "fuel cell" is to be understood as a galvanic cell which converts the chemical reaction energy of a continuously supplied fuel, in the present case hydrogen, and an oxidizing agent, in the present case oxygen, into electrical energy. The electrical energy obtained can be used, for example, to drive an electric motor, not shown, which in turn drives the wheels 5, 6 or at least two of the wheels 5, 6.

Figure 2:
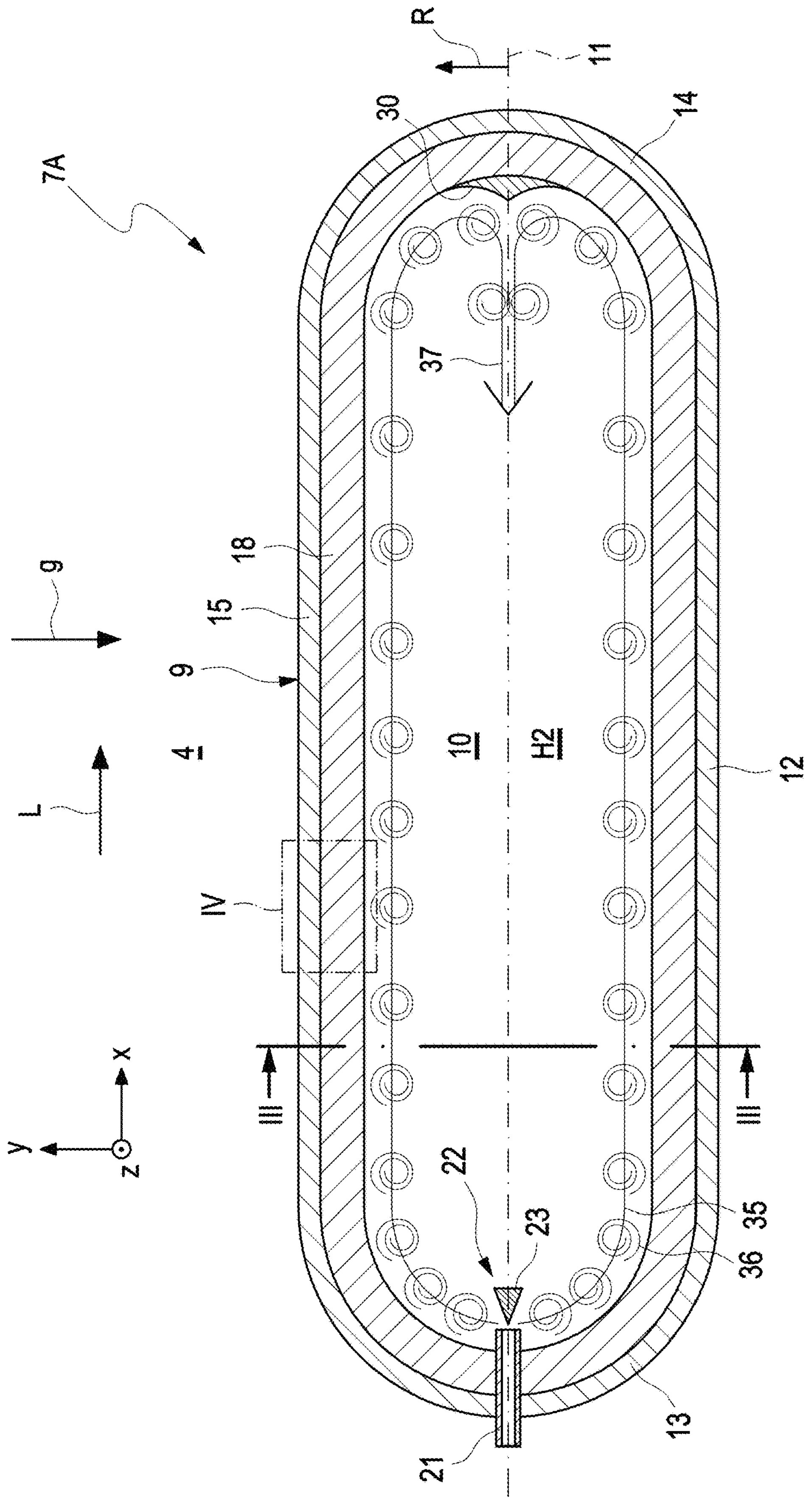
FIG. 2 shows a schematic sectional view of an embodiment of a pressurized-gas storage container for the vehicle according to FIG. 1.
Figure 3:
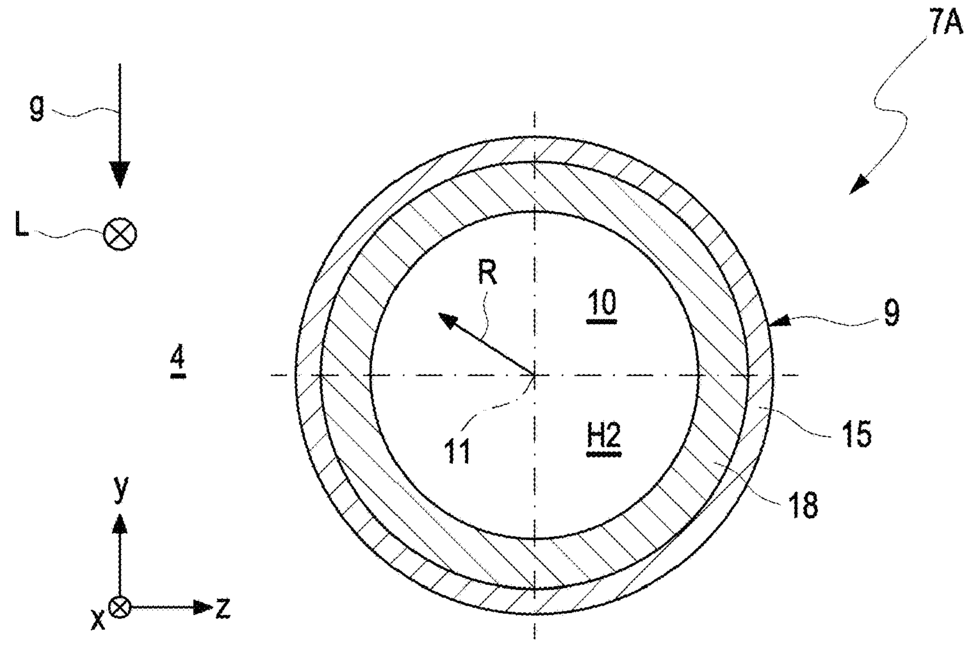
FIG. 3 shows another schematic sectional view of the pressurized-gas storage container according to sectional line III-III of FIG. 2.
Figure 4:
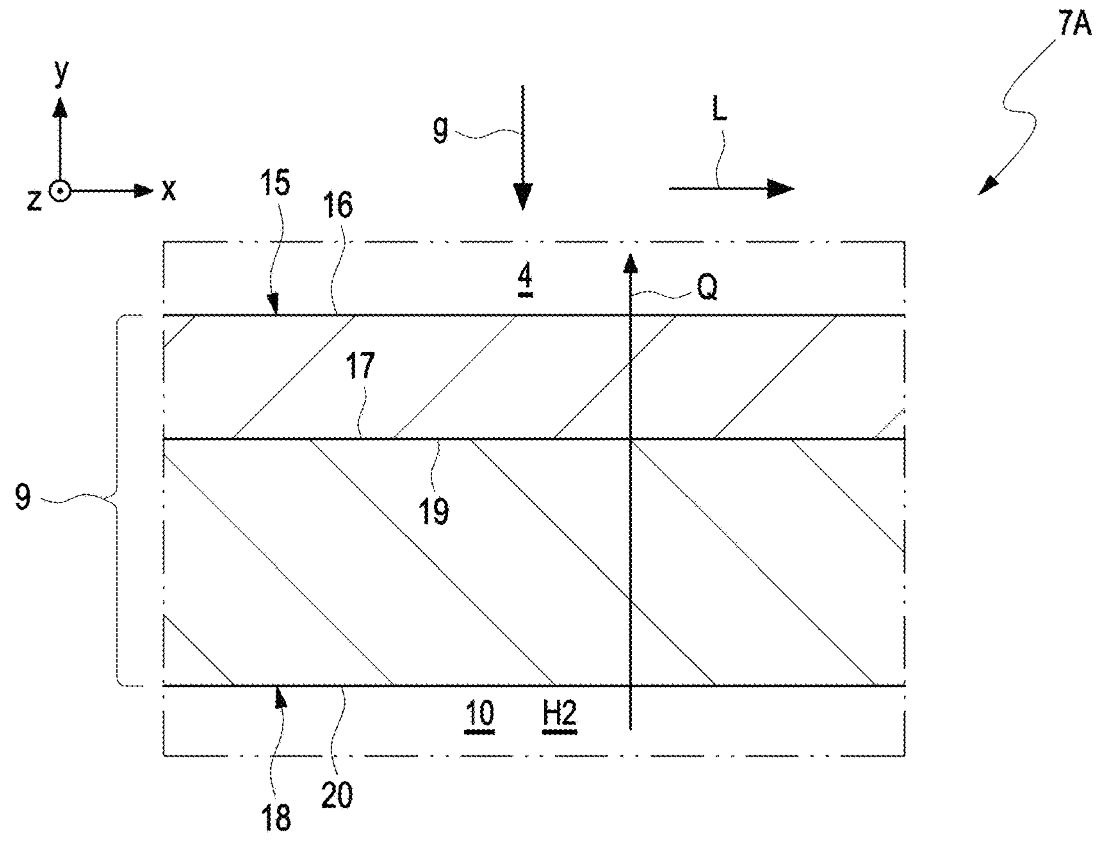
FIG. 4 shows the detailed view IV according to FIG. 2.

FIG. 2 shows a schematic sectional view of an embodiment of a pressurized-gas storage container 7A as mentioned above. FIG. 3 shows a further schematic sectional view of the pressurized-gas storage container 7A according to the sectional line III-III of FIG. 2. FIG. 4 shows the detailed view IV according to FIG. 2. In the following, reference is made to FIGS. 2 to 4 simultaneously.

The pressurized-gas storage container 7A is suitable for storing a gas, in this case hydrogen H2, under high pressure in gaseous form and releasing it again as required. For example, the pressurized-gas storage container 7A is operated under a pressure of several 100 bar, for example from 800 to 1,000 bar. The pressurized-gas storage container 7A may also be referred to as pressurized-gas storage tank, hydrogen pressurized-gas storage container, hydrogen pressurized-gas storage tank or hydrogen storage container.

In principle, the pressurized-gas storage container 7A is suitable for holding or storing any gas. In the following, however, it is assumed that the gas is hydrogen H2. The terms "gas" and "hydrogen" can therefore be used interchangeably. As previously mentioned, the hydrogen H2 is stored in its gaseous aggregate state in the pressurized-gas storage container 7A. The hydrogen H2 is therefore single-phase. There is therefore preferably no liquid phase and thus no phase boundary within the pressurized-gas storage container 7A.

The pressurized-gas storage container 7A comprises a container wall or wall 9, which encloses a receiving area 10 for receiving the hydrogen H2. The gaseous hydrogen H2 is accommodated in the receiving area 10. The receiving area 10 is cylindrical. A geometry or a spatial extent of the receiving area 10 is defined or limited by the wall 9. The receiving area 10 is a cavity completely enclosed by the wall 9. As will be explained below, the wall 9 is multi-layered or multi-sheeted. This means that different materials form the wall 9 in a layered structure.

A coordinate system with a length direction or x-direction x, a height direction or y-direction y and a depth direction or z-direction z is assigned to the pressurized-gas storage container 7A. The directions x, y, z are oriented perpendicular to each other. A longitudinal direction L of the pressurized-gas storage container 7A runs along the x-direction x. This means that the longitudinal direction L and the x-direction x are identical. A direction of gravity g is oriented in the opposite direction and parallel to the y-direction y.

A symmetry or middle axis 11 is assigned to the pressurized-gas storage container 7A or the wall 9, to which the pressurized-gas storage container 7A or the wall 9 is essentially rotationally symmetrical. "Essentially" rotationally symmetrical includes an at least slightly oval cross-section. The middle axis 11 runs parallel to the x-direction x. Accordingly, the middle axis 11 also runs along the longitudinal direction L. A radial direction R of the pressurized-gas storage container 7A or the wall 9 is oriented perpendicular to the middle axis 11 and away from it in the direction of the wall 9.

The wall 9 can also be referred to as the container wall, shell, envelope or barrier. The wall 9 is rotationally symmetrical to the middle axis 11. In cross-section, the wall 9 is therefore preferably circular. However, the wall 9 can also be oval or slightly oval in cross-section. The wall 9 comprises a tubular or hollow cylindrical basic section 12, which is rotationally symmetrical to the middle axis 11.

A first cover section or first wall end section 13 and a second cover section or second wall end section 14 are provided on each end face of the basic section 12, i.e. on the left and right in the orientation shown in FIG. 2. The wall end sections 13, 14 are curved in the shape of a dome or dome-shaped and are each rotationally symmetrical to the middle axis 11. The wall end sections 13, 14 can also be referred to as cover sections. The wall end sections 13, 14 are curved outwards with respect to the receiving area 10. The basic section 12 and the wall end sections 13, 14 are firmly, in particular non-detachably, connected to one another. The wall 9 comprises a cylindrical geometry.

The wall 9 comprises a load-bearing jacket 15, which is made of a fiber-reinforced plastic material or a fiber composite plastic. The jacket 15 is on the outside and thus faces the surroundings 4. This means that the jacket 15 is adjacent to the surroundings 4. The fact that the jacket 15 is "load-bearing" means in particular that the jacket 15 absorbs all or at least a large part of the loads that act on the wall 9 or on the pressurized-gas storage container 7A. The loads can result from the pressurized hydrogen H2 itself and/or from external loads, for example in the event of a traffic accident.

The jacket 15 can also be referred to as a sheath, coating, support layer, outer coating or outer layer of the wall 9. The jacket 15 is preferably constructed of the fiber composite plastic in layers or in sheets. However, this does not exclude the possibility that the jacket 15 may also comprise metallic components. The jacket 15 comprises an outer side 16 facing the surroundings 4 and an inner side 17 facing the receiving area 10 (FIG. 4).

A fiber composite plastic as mentioned above comprises a plastic material, in particular a plastic matrix, in which fibers, for example natural fibers, glass fibers, carbon fibers, ara-mid fibers or the like, are embedded. The plastic material can be a thermoset, such as an epoxy resin or a vinyl ester-based resin. However, the plastic material can also be a thermo-plastic. The fibers can be continuous fibers.

The jacket 15 is preferably an integral component, in particular a one-piece material component. In the present case, "integral" or "one-piece" means that the jacket 15 forms one component and is not composed of different parts or components that can be separated from each other again. In the present case, "one-piece material" means that the jacket 15 is made of the same material throughout, namely the fiber composite plastic. The jacket 15 is provided both on the basic section 12 and on the two wall end sections 13, 14.

In addition to the jacket 15, the wall 9 comprises a liner 18 lining the jacket 15. The liner 18 can also be referred to as the inner coating or inner layer of the wall 9. The jacket 15 can be wound onto the liner 18 or onto a mold or mandrel not shown to produce the same. The liner 18 is gas tight. The jacket 15 is not necessarily gas tight. The liner 18 may comprise a fiber composite plastic, various plastic materials and/or metallic materials. The liner 18 is a so-called lining or may be referred to as the lining of the pressurized-gas storage container 7A.

The liner 18 comprises a tubular or hollow cylindrical geometry. The liner 18 is rotationally symmetrical to the middle axis 11. The liner 18 is provided both at the basic section 12 and at the wall end sections 13, 14. The liner 18 can comprise a layered or layer-like structure. The jacket 15 completely encloses or encapsulates the liner 18.

The liner 18 comprises (e.g., having) an outer side 19 facing the inner side 17 of the jacket 15 (FIG. 4) and an inner side 20 facing the receiving area 10. The inner side 20 is in contact with the hydrogen H2 held in the receiving area 10. The inner side 20 can also be referred to as the inner side of the wall 9 or the inner side of the pressurized-gas storage container 7A. The inner side 20 completely encloses the cylindrical receiving area 10 and thus defines its spatial extent.

The jacket 15 and the liner 18 are materially bonded to each other, in particular glued to each other, on the inner side 17 of the jacket 15 and on the outer side 19 of the liner 18. In the case of materially bonded connections, the connecting partners are held together by atomic or molecular forces. Materially bonded connections are non-detachable connections that can only be separated again by destroying the connecting means and/or the connecting partners.

The pressurized-gas storage container 7A further comprises an injection nozzle or inlet nozzle 21 in communication with the receiving area for injecting or letting the hydrogen H2 into the receiving area 10. The inlet nozzle 21 having an outlet 25 and having an end face 29. The inlet nozzle 21 is preferably provided at the first wall end section 13 of the wall 9. Alternatively, the inlet nozzle 21 may also be placed at the second wall end section 14. Preferably, the inlet nozzle 21 passes through both the jacket 15 and the liner 18. The inlet nozzle 21 may be made of a metallic material.

The inlet nozzle 21 is preferably designed in such a way that it is rotationally symmetrical to the middle axis 11. In particular, the inlet nozzle 21 is centered or centrally arranged with respect to the middle axis 11. Deviating from this, the inlet nozzle 21 can also be arranged off-center, i.e. offset with respect to the middle axis 11. The inlet nozzle 21 is preferably tubular or hollow cylindrical and in particular comprises an annular cross-section. Deviating from this, however, the inlet nozzle 21 can also comprise any other cross-section.

The inlet nozzle 21 may comprise a plurality of canals, holes, nozzles, valves, switches and/or sensor technologies that enable the pressurized-gas storage container 7A to be refueled or filled with the gaseous hydrogen H2. The inlet nozzle 21 can project beyond the inner side 20 of the liner 18 in the region of the first wall end section 13 and thus into the receiving area 10. The inlet nozzle 21 is configured to let or inject the hydrogen H2 parallel to the middle axis 11 or along the longitudinal direction L or along the x-direction x into the receiving area 10.

The pressurized-gas storage container 7A further comprises a gas guide apparatus 22, which is configured to supply at least part of the hydrogen H2 along an inner side of the wall 9 during filling of the receiving area 10 with the hydrogen H2. This means that the gas guide apparatus 22 guides the hydrogen H2 at least partially in the radial direction R radially outwards away from the middle axis 11 towards the inner side 20 of the wall 9.

In this case, the gas guide apparatus 22 guides the hydrogen H2 along the middle axis 11 from the first wall end section 13 towards the second wall end section 14 during filling of the receiving area 10. The gas guide apparatus 22 may also be referred to as a gas directing apparatus or a gas guide and gas cooling apparatus.

The gas guide apparatus 22 diverts or diverts at least part of the hydrogen H2 filled into the receiving area 10 during filling in order to guide it along the inner side of the wall 9. "Inner side" in the present case means facing the receiving area 10. In particular, the hydrogen H2 is guided along the inner side 20 of the liner 18.

When the hydrogen H2 passes along the wall 9, the hydrogen H2 can release heat Q to the wall 9 or the wall 9 can extract heat Q from the hydrogen H2. The wall 9 then releases the heat Q to the surroundings 4. For this purpose, the wall 9 acts as a heat transferrer or heat exchanger for transferring the heat Q from the hydrogen H2 to the surroundings 4. Within the wall 9, the heat Q is preferably transferred by means of heat conduction.

As will be explained below, the gas guide apparatus 22 may comprise a plurality of internals and/or components, which may be arranged at least in sections in the receiving area 10 and/or at least in sections outside the receiving area 10. The internals and/or components may, for example, comprise guide ribs, guide plates, fins, fins provided with turbulators and/or lou-vers, fins arranged with swirls, struts, turbulators, flow straighteners, nubs or comparable de-vices for increasing the heat transfer and/or the heat transfer surface. However, the internals can also include tubes, pipes, ducts, various gas guide elements, guide tubes, heat pipes, canals, cooling canals, cooling lines or the like.

The gas guide apparatus 22 may comprise a first gas guide element 23. The first gas guide element 23 may also be referred to as a gas guide cone or a gas guide taper. Further, the first gas guide element 23 may also be referred to as a first gas diverter element. The first gas guide element 23 is arranged completely within the receiving area 10. The first gas guide element 23 is thereby provided in or at the inlet nozzle 21 opening into the first wall end section 13. "In or on" means in particular that the first gas guide element 23 can be positioned both completely outside and at least in sections inside the inlet nozzle 21.

Figure 5:
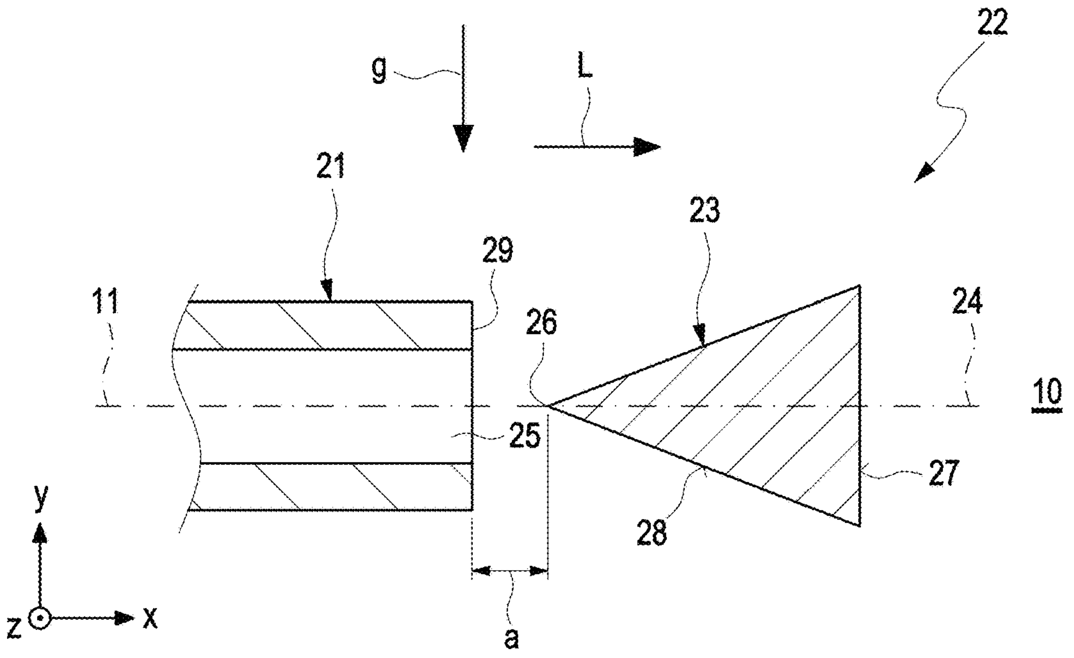
FIG. 5 shows a schematic sectional view of an embodiment of a gas guide apparatus for the pressurized-gas storage container according to FIG. 2.

The first gas guide element 23 is shown in a schematic sectional view in FIG. 5. The first gas guide element 23 is preferably rotationally symmetrical with respect to a symmetry or middle axis 24. As FIG. 5 shows, the middle axes 11, 24 can be arranged coaxially. This means that the middle axis 11 and the middle axis 24 are identical. The first gas guide element 23 may be made of a metallic material, for example aluminum or stainless steel. However, the first gas guide element 23 may also comprise a fiber composite material.

The first gas guide element 23 is conical or cone-shaped, at least in sections. However, the first gas guide element 23 can comprise any shape or curvature. The first gas guide element 23 can also comprise any concave and/or convex surfaces or surfaces with the aid of which the hydrogen H2 is guided or directed during the inlet or injection into the receiving area 10.

For example, the first gas guide element 23 comprises a tip 26 facing an outlet 25 of the inlet nozzle 21 and an end face 27 facing away from the outlet 25. The outlet 25 can also be referred to as the outlet opening. The tip 26 is not necessarily pointed. The tip 26 can also be rounded or flattened. Furthermore, a flat end face can also be provided instead of a tip 26. The first gas guide element 23 comprises an at least sectionally conical or cone-shaped jacket surface 28, on which, in the orientation of FIG. 5, the tip 26 is provided on the left-hand side and the end face 27 is provided on the right-hand side.

A cross-section or a cross-sectional area of the first gas guide element 23 widens starting from the tip 26 in the direction of the end face 27. This also means that the cross-section of the first gas guide element 23 widens starting from the inlet nozzle 21 or the first wall end section 13 in the direction of the second wall end section 14. The fact that the first gas guide element 23 "widens" is to be understood in the present case as meaning that the cross-section of the first gas guide element 23 becomes larger starting from the tip 26 in the direction of the end face 27.

Preferably, the first gas guide element 23 is placed with the aid of retaining structures, which are not shown in FIG. 5, in such a way that the middle axes 11, 24 are arranged coaxially to one another. However, a staggered arrangement can also be provided. In this case, a distance "a" may be provided between the outlet 25, in particular an end face 29 of the outlet 25, and the tip 26. The distance a can be a few millimeters to a few centimeters.

Alternatively, the tip 26 can also be placed at least in sections within the outlet 25. In this case, the first gas guide element 23 is received at least in sections, that is, in particular with its tip 26, in the outlet 25. In this case, no distance "a" is provided between the tip 26 and the outlet 25. Rather, the tip 26 protrudes behind the end face 29 of the outlet 25. In particular, this means that the tip 26 projects into the outlet 25 when viewed along the x-direction x or along the longitudinal direction L.

As previously mentioned, the first gas guide element 23 is arranged in particular in such a way that the middle axes 11, 24 are arranged coaxially to one another. In this case, the first gas guide element 23 is positioned centrally in front of the inlet nozzle 21. However, the first gas guide element 23 can also be positioned off-center with respect to the inlet nozzle 21. For example, the first gas guide element 23 can be displaced along the y-direction y and/or along the z-direction z relative to the middle axis 11.

The first gas guide element 23 is thus positioned off-center in the latter case. This means that the hydrogen H2 is aerated onto the first gas guide element 23 off-center when the receiving area 10 is filled. When the first gas guide element 23 is viewed in the direction opposite the longitudinal direction L or opposite the x-direction x, it at least partially covers the inlet nozzle 21, in particular the outlet 25 of the inlet nozzle 21. The first gas guide element 23 can also completely cover or conceal the outlet 25, as shown in FIG. 5.

Figure 6:
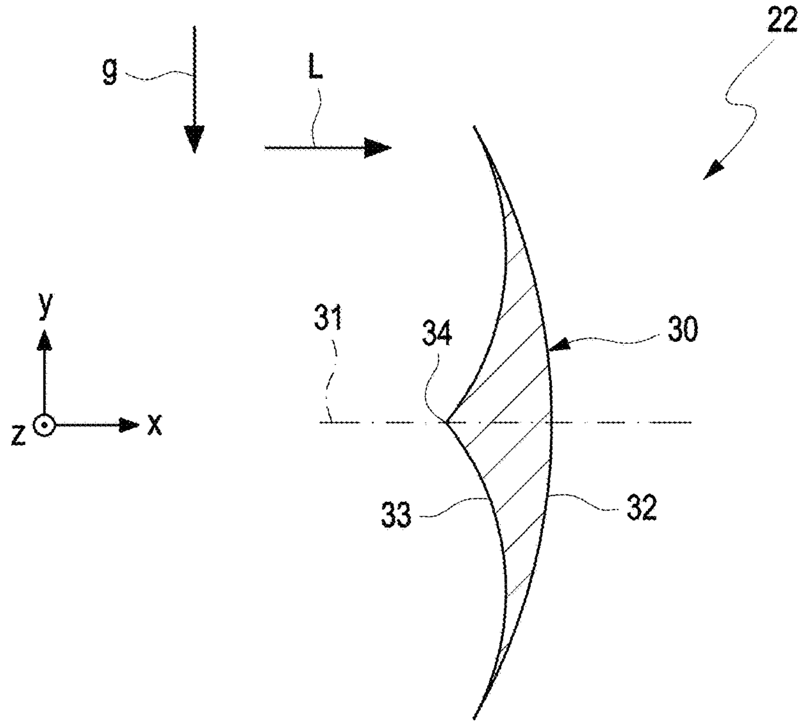
FIG. 6 shows another schematic sectional view of the gas guide apparatus according to FIG. 5.

Optionally, the gas guide apparatus 22 can comprise a second gas guide element 30 in addition to the first gas guide element 23. The second gas guide element 30 is shown in a schematic sectional view in FIG. 6. In contrast to the first gas guide element 23, the second gas guide element 30 is not attached to the first wall end section 13, but to the second wall end section 14. The second gas guide element 30 may also be referred to as a second gas bypass element.

The first gas guide element 23 and the second gas guide element 30 are two separate parts or components of the gas guide apparatus 22 of the pressurized-gas storage container 7A. The first gas guide element 23 and the second gas guide element 30 are therefore not identical. The second gas guide element 30 can be an integral part of the liner 18. This means in particular that the liner 18 and the second gas guide element 30 can form an integral component, in particular a one-piece material component.

The second gas guide element 30 can, for example, be made of a metallic material, in particular aluminum or stainless steel, and/or of a fiber composite plastic. The second gas guide element 30 is rotationally symmetrical with respect to an axis of symmetry or middle axis 31. In particular, the second gas guide element 30 is placed completely within the receiving area 10. In this case, the middle axis 31 of the second gas guide element 30 and the middle axis 11 of the wall 9 are arranged coaxially to one another. In particular, the middle axes 11, 24 can also be arranged coaxially to one another.

The second gas guide element 30 comprises a rear side 32, which is connected to the inner side 20 of the liner 18 in the region of the second wall end section 14. The rear side 32 is curved in the shape of a dome or dome shaped. In particular, the rear side 32 can also be spherical dome shaped. In the present case, a "spherical dome" is to be understood as a section of a sphere. For example, the inner side 20 and the rear side 32 are glued together.

Facing the receiving area 10 or the hydrogen H2, the second gas guide element 30 comprises a curved or bent front side 33, which faces away from the rear side 32. The front side 33 faces the first wall end section 13. In particular, the front side 33 faces the inlet nozzle 21, in particular the end face 29 of the inlet nozzle 21. The front side 33 is at least in sections or partially conical or cone shaped. In particular, the front side 33 may taper towards or converge towards a tip 34 placed on the middle axis 31. The front side 33 may comprise convex and/or concave shaped areas or surfaces.

The functionality of the pressurized-gas storage container 7A is summarized below. The pressurized-gas storage container 7A can be filled or refueled with the gaseous hydrogen H2 using a refueling system not shown. The refueling system comprises a stationary gas tank or hydrogen tank, a refueling hose and/or a coupling device for coupling the refueling hose to a tank nozzle of the vehicle 1.

Depending on the requirements of the consumer 8, the pressurized-gas storage container 7A releases the hydrogen H2 to the consumer 8. For this purpose, a hydrogen supply system of the vehicle 1, not shown, can be provided between the pressurized-gas storage container 7A and the consumer 8. For example, this supply system can be used to supply the consumer 8 with hydrogen H2 at a supply pressure and supply temperature suitable for the consumer 8.

When the receiving area 10 is filled with the hydrogen H2, it is expanded into the receiving area 10 via the inlet nozzle 21. This causes the temperature in the receiving area 10 to rise. The temperature is highest at the second wall end section 14 located furthest from the inlet nozzle 21.

Due to this temperature increase, the pressure in the receiving area 10 increases, which in turn can supply that a complete filling of the receiving area 10 with the hydrogen H2 is only possible if the refueling process is interrupted and then it is waited until the temperature in the receiving area 10 and thus also the pressure in the receiving area 10 has fallen again to an acceptable level. This makes the refueling process or filling process of the pressurized-gas storage container 7A time-consuming, which needs to be improved.

With the aid of the gas guide apparatus 22, it is now possible to supply the hydrogen H2 injected into the receiving area 10 at least partially along the inner side of the wall 9. In doing so, the wall 9 acts as a heat exchanger in order to extract heat Q from the hydrogen H2 during the filling of the receiving area 10 with the hydrogen H2 and to release it to the surroundings 4. The gas guide apparatus 22 thus acts synergistically with the wall 9 to extract heat Q from the receiving area 10 or from the hydrogen H2 and to dissipate or conduct it to the surroundings 4.

In the present case, the hydrogen H2 is aerated onto the center of the first gas guide element 23 with the aid of the inlet nozzle 21. As a result, the hydrogen H2 is directed radially outwards in the radial direction R against the inner side 20 of the liner 18 with the aid of the conical jacket surface 28 of the first gas guide element 23. This results in a gas stream 35, as shown in FIG. 2, which is guided from the inlet nozzle 21 or the first gas guide element 23 along the wall 9 in the direction of the second wall end section 14.

The gas stream 35 can be laminar and/or turbulent at least some of the time. In the present case, a "laminar" flow is understood to be a movement of a fluid in which no visible turbulence occurs in a transitional region between two different flow velocities that spreads out perpendicular to the direction of flow. The fluid, in this case hydrogen H2, flows in layers that do not mix with each other.

In contrast to this, a "turbulent" flow is a movement of fluids in which turbulence occurs over a wide range of size scales. This type of flow is characterized by a three-dimensional flow field with a component that appears to vary randomly in time and space. Since the gas stream 35 follows the wall 9, in particular the inner side 20 of the wall 9, this can also be referred to as a developed or adjacent flow or as a developed or adjacent gas stream 35.

The gas stream 35 supplies along the inner side 20 from the inlet nozzle 21 to the second wall end section 14. The gas stream 35 can also be referred to as a gas flow, hydrogen stream or hydrogen flow. In this case, the gas stream 35 is in contact with the inner side 20 of the wall 9. This means that the inner side 20 is constantly flushed with fresh hydrogen H2. The gas stream 35 is supplied along the longitudinal direction L. The gas stream 35 can be turbulent and comprise turbulence or vortexes 36.

The gas stream 35 comprises a tubular or hollow cylindrical geometry extending from the first wall end section 13 to the second wall end section 14. The gas stream 35 is thus jacket shaped. The gas stream 35 can also be referred to as a sheath flow. The gas stream 35 is in contact with the inner side 20, while the gas stream 35 moves along the longitudinal direction L.

At the second wall end section 14, the gas stream 35 is diverted back in the direction of the inlet nozzle 21 or in the direction of the first gas guide element 23 with the aid of the second gas guide element 30. Here, the gas stream 35 strikes the conically shaped front side 33 of the second gas guide element 30, as a result of which the gas stream 35 is guided back along the middle axis 11 in the direction of the first wall end section 13 as a counter gas stream 37. As a result, heat Q is dissipated from the second wall end section 14 with the aid of the hydrogen H2 deflected by the second gas guide element 30.

The counter gas stream 37 is oriented in the opposite direction to the longitudinal direction L and thus also in the opposite direction to the gas stream 35. The gas stream 35 is oriented along the longitudinal direction L. The gas stream 35 and the counter gas stream 37 comprise opposite flow directions. The counter gas stream 37 flows back to the first gas guide element 23, in particular within the jacket shaped gas stream 35. The gas stream 35 thus circumferentially surrounds or encloses the counter gas stream 37. "Circumferentially" means viewed along a circumference of the gas stream 35. The counter gas stream 37 may also be referred to as a counter gas flow, counter hydrogen stream or counter hydrogen flow.

It is thus possible to generate a continuous gas stream 35 on the inner side of the wall 9, which can comprise vortexes 36. Due to the vortexes 36, a better heat transfer from the hydrogen H2 to the wall 9 is possible. The hydrogen H2 conducted along the wall 9, which heats up during injection into the receiving area 10, can be cooled down again by dissipating the heat Q extracted from the receiving area 10 to the surroundings 4. The gas stream 35 and the counter gas stream 37 also ensure a uniform temperature distribution within the receiving area 10. In particular, the hydrogen H2 is evenly mixed.

With the help of the gas guide apparatus 22, the gas stream 35 is thus forced to lie or nestle against the inner side of the wall 9 or the inner side 20. This intensifies the contact of the hydrogen H2 with the wall 9 and thus improves the transfer of the heat Q. In particular, the so-called Coanda effect is also utilized. The "Coanda effect" refers to physical phenomena that suggest a tendency of a fluid flow to "run along" a convex surface instead of detaching from it and continuing to move in the original flow direction. For example, the first gas guide element 23 and/or the second gas guide element 30 may comprise such a convex surface.

The wall 9 itself acts as a heat transferrer or heat exchanger between the receiving area 10 and the surroundings 4. In particular, this means that the wall 9 is configured to transfer heat Q from the receiving area 10 or the hydrogen H2 to the surroundings 4 or to release it to the latter. To ensure that the wall 9 is thermally conductive, it can comprise thermally conductive components, such as metallic materials.

Furthermore, heat discharge elements or at least one heat discharge element can also be provided, which transfer heat Q from the receiving area 10 to the surroundings 4 by means of heat conduction. The heat discharge elements or the heat discharge element can be part of the wall 9. For example, a heat discharge element can be provided in the form of a lance pro-jecting from the surroundings 4 into the receiving area 10 or a heat pipe.

A "heat pipe" is a tubular or rod-shaped device in the form of a heat exchanger that allows a high heat flow density by utilizing the enthalpy of vaporization of a working medium. In this way, large amounts of heat can be transported over a small cross-sectional area. The working medium can be water, ammonia or a mixture of water and ammonia, for example.

The aforementioned working medium then evaporates within the receiving area 10, into which the heat pipe protrudes, where it absorbs heat Q, and condenses in the surroundings 4, into which the heat pipe also protrudes, whereby the absorbed heat Q is released again. The working medium does not leave the heat pipe. However, the heat pipe can be provided with an active cooling system, which dissipates heat Q, for example, from the heat pipe projecting from the wall 9 into the surroundings 4.

The mode of operation explained above basically involves passive cooling or passive temperature control of the pressurized-gas storage container 7A. In particular, a passive heat transfer is carried out from the receiving area 10 to the surroundings 4. In the present case, "passive" means in particular that heat Q is essentially only transferred from the receiving area 10 to the surroundings 4 by heat conduction with the aid of the wall 9. A coolant circuit with a circulating coolant or a refrigerant circuit with a refrigerant is preferably not provided in this case. In particular, no moving parts, such as a pump, are provided for passive cooling.

The term "coolant" refers to gaseous, liquid or solid substances or mixtures of substances that are used to transport heat Q away. The difference to a "refrigerant" is that a refrigerant in a refrigeration circuit can transport heat Q against a temperature gradient, so that a temperature of an area to which heat Q is to be transported can be higher than a temperature of an area from which heat Q is to be dissipated, whereas a coolant is only capable of transporting the enthalpy along the temperature gradient from an area of higher temperature to an area of lower temperature in a coolant circuit.

In contrast to this, an "active" heat transfer uses a coolant or refrigerant to transport heat Q. Thus, in the present case, "active" means in particular that a coolant or refrigerant is forcibly circulated, for example with the aid of a pump or with the aid of a cooling canal supplied with hydrogen H2, and in particular with the supply of external energy, in order to remove heat Q from the receiving area 10. Against the background of this definition, a heat pipe as mentioned above is to be regarded as passive, since the working medium is conveyed purely due to the capillary effect or temperature differences within the heat pipe.

Figure 7:
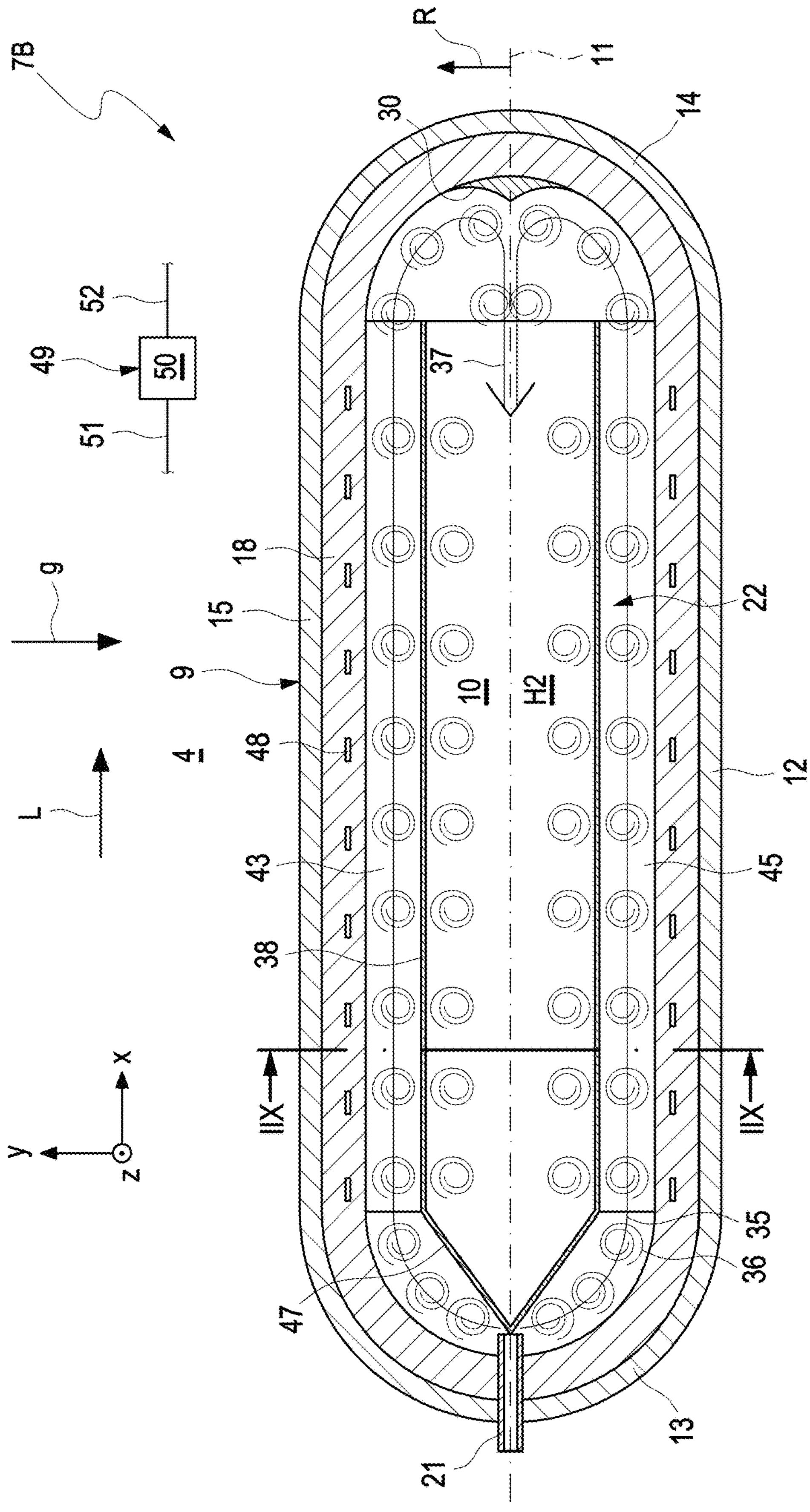
FIG. 7 shows a schematic sectional view of another embodiment of a pressurized-gas storage container for the vehicle according to FIG. 1.
Figure 8:
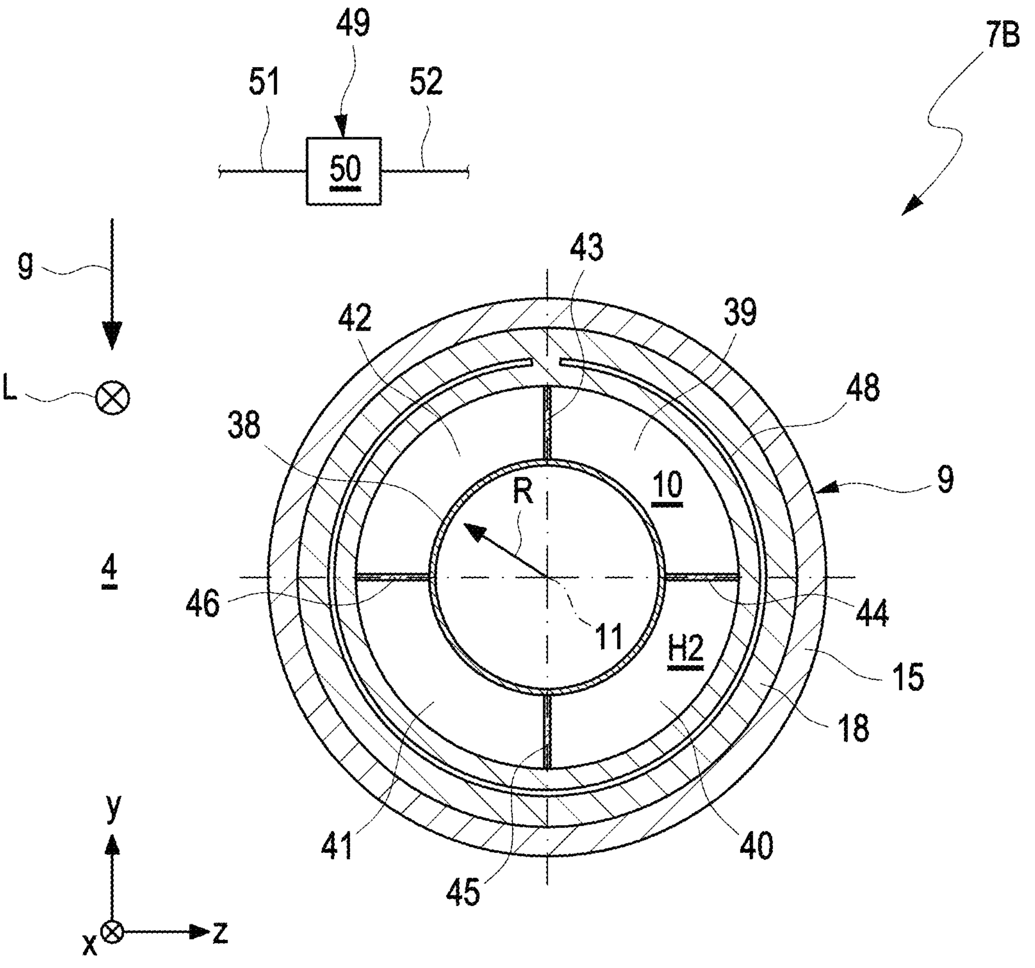
FIG. 8 shows another schematic sectional view of the pressurized-gas storage container according to sectional line IIX-IIX of FIG. 7.

FIG. 7 shows a schematic sectional view of another embodiment of a pressurized-gas storage container 7B for the vehicle 1. FIG. 8 shows a further schematic sectional view of the pressurized-gas storage container 7B along the sectional line IIX-IIX of FIG. 7. In the following, reference is made to FIGS. 7 and 8 simultaneously.

The structure of the pressurized-gas storage container 7B essentially corresponds to the structure of the pressurized-gas storage container 7A. Therefore, only differences between the two embodiments of the pressurized-gas storage container 7A, 7B are discussed below. All aspects and features of the pressurized-gas storage container 7A explained above are applicable to the pressurized-gas storage container 7B. Conversely, all aspects and features of the pressurized-gas storage container 7B explained below are applicable to the pressurized-gas storage container 7A.

In contrast to the pressurized-gas storage container 7A, the pressurized-gas storage container 7B comprises a gas guide tube 38 associated with the gas guide apparatus 22. The gas guide tube 38 is placed completely within the receiving area 10. The gas guide tube 38 comprises a cylindrical geometry. In particular, the gas guide tube 38 is rotationally symmetrical to the middle axis 11. The gas guide tube 38 is placed in the center of the receiving area 10. The gas guide tube 38 can, for example, be made of a metallic material, such as an aluminum alloy or stainless steel.

A cylindrical gas guide canal 39 is formed between the gas guide tube 38 and the wall 9. In particular, several gas guide canals 39 to 42 are provided, which are separated from each other by means of gas guide ribs 43 to 46, which are also part of the gas guide apparatus 22. The number of gas guide ribs 43 to 46 is arbitrary. For example, four gas guide ribs 43 to 46 are provided, which can be firmly connected to the gas guide tube 38.

For example, the gas guide ribs 43 to 46 can hold the gas guide tube 38 centrally in the receiving area 10. The gas guide canals 39 to 42 run along the longitudinal direction L from the first wall end section 13 to the second wall end section 14. The receiving area 10 is di-vided circumferentially into the four gas guide canals 39 to 42 with the help of the gas guide ribs 43 to 46. The gas guide canals 39 to 42 can be in fluid connection with each other or fluidically separated from each other. In the first case, an exchange of hydrogen H2 between the gas guide canals 39 to 42 is possible, in the second case it is not. According to one embodiment, the gas guide apparatus itself forms a thermal bridge between the receiving area and the surroundings in order to extract heat from the gas and release it to the surroundings.

A conical or cone-shaped gas guide section 47 is associated with the gas guide tube 38. The gas guide section 47 can be firmly connected to the gas guide tube 38. The gas guide section 47 is acted upon centrally by the inlet nozzle 21 with the hydrogen H2. The gas guide section 47 deflects (e.g., redirects) the hydrogen H2 gas exiting the inlet nozzle outwards, viewed in the radial direction R, into the gas guide canals 39 to 42. This forms a gas stream 35 as mentioned above, which is diverted back towards the inlet nozzle 21 as a counter gas stream 37 with the aid of the second gas guide element 30 inside the gas guide tube 38.

Optionally, the gas guide apparatus 22 of the pressurized-gas storage container 7B may comprise one or more cooling canals 48. For example, a cooling canal 48 may be provided which runs around the middle axis 11 in a spiral or helical manner and extends from the first wall end section 13 to the second wall end section 14. In areas where a particularly large amount of heat Q needs to be dissipated, the number of windings of the cooling canal 48 can be increased or enlarged.

The cooling canal 48 may be arranged within the material used for the liner 18. Alternatively, the cooling canal 48 can also be arranged within the material used for the jacket 15.

Furthermore, the cooling canal 48 can also be provided on the inner side of the receiving area 10 or on the outer side of the wall 9.

The cooling canal 48 can be an integral part of the wall 9. That is, the cooling canal 48 is provided as a cavity in the wall 9. Thus, the cooling canal 48 is not formed as a component or part separate from the wall 9. Alternatively, however, the cooling canal 48 can also be designed as a component that can be separated from the wall 9 or as a component that is subse-quently attached to the wall 9.

The cooling canal 48 ensures active dissipation of heat Q. The gaseous hydrogen H2 can flow through the cooling canal 48. In particular, at least a portion of the hydrogen H2 introduced into the receiving area 10 flows through the cooling canal 48 during filling of the receiving area 10. Furthermore, a portion of the hydrogen H2 can be directly inlet into the receiving area 10 and a portion of the hydrogen H2 can be guided along the inner side of the wall 9. The entire hydrogen H2 introduced can also be guided along the inner side of the wall 9.

The cooling canal 48 may include a device or valve that allows the cooling canal 48 to expand the portion of hydrogen H2 that has flowed through the cooling canal 48 into the receiving area 10. Advantageously, an additional coolant or refrigerant can be dispensed with when hydrogen H2 is used. However, a coolant or refrigerant can also be provided, which is circulated with the aid of a pump.

As an alternative to the flow of hydrogen H2 through the cooling canal 48, it is also possible to use any other coolant or refrigerant. For example, the cooling canal 48 is part of a refrigerant circuit 49, which comprises a thermo module 50, the cooling canal 48 and supply and/or discharge lines 51, 52. The supply and/or discharge lines 51, 52 are in fluid connection with the cooling canal 48 (not shown). The thermo module 50 can be an air conditioning system or automatic air conditioning system of the vehicle 1 or can be referred to as an air conditioning system or automatic air conditioning system.

For example, R1234yf (2,3,3,3-tetrafluoropropene) or R744 (carbon dioxide) can be used as the refrigerant that is fed through the cooling canal 48. Alternatively, R290 (propane) can also be used. The thermo module 50 is configured to air-condition the vehicle interior 3. The thermo module 50 can comprise a compressor for compressing the refrigerant. The refrigerant extracts heat Q from the receiving area 10 as it flows through the cooling canal 48. The refrigerant can at least partially evaporate in the process. The cooling canal 48 or the wall 9 can thus act as an evaporator of the refrigerant circuit 49. The thermo module 50 can comprise a condenser for condensing the refrigerant.

Water, in particular cooling water, glycol or various brines can be used as a coolant, for example. The coolant can then be pumped or conducted through the cooling canal 48. In this case, the cooling canal 48 can be part of a coolant circuit. The coolant circuit may comprise a pump, in particular a water pump, in addition to the cooling canal 48. In the present case, a "brine" is to be understood in particular as an aqueous salt solution. For example, cooling water can flow through the cooling canal 48 for cooling or for removing heat Q, which absorbs and removes heat Q. The cooling water can, for example, be pumped through the cooling canal 48.

Figure 9:
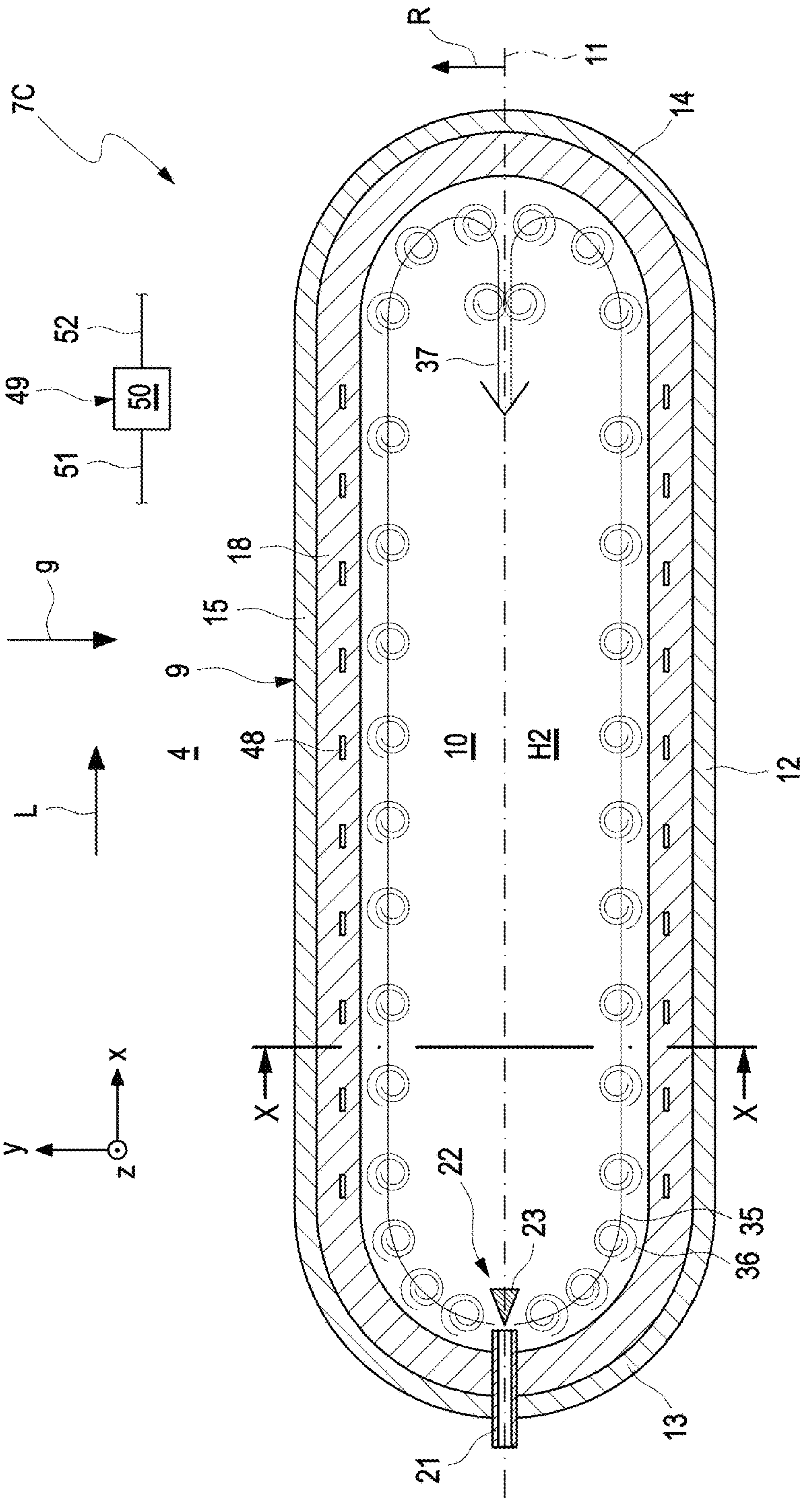
FIG. 9 shows a schematic sectional view of another embodiment of a pressurized-gas storage container for the vehicle according to FIG. 1.
Figure 10:
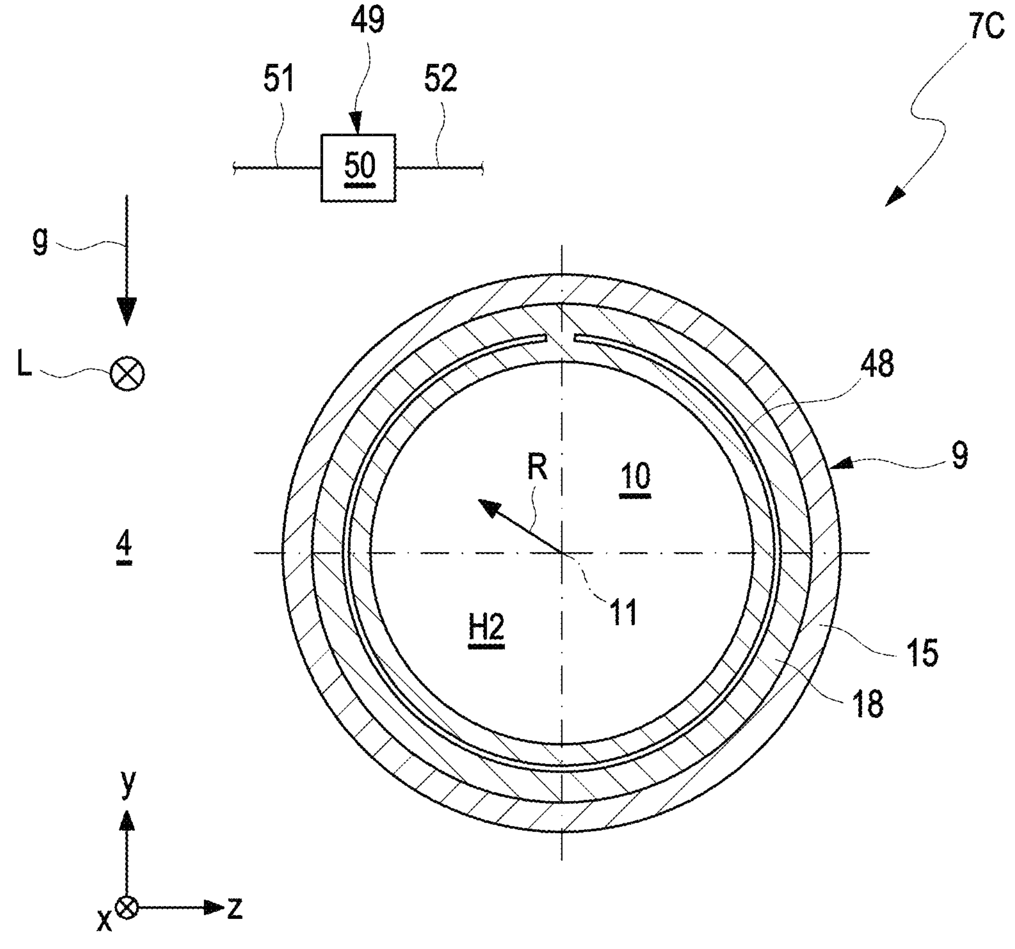
FIG. 10 shows another schematic sectional view of the pressurized-gas storage container according to the sectional line X-X of FIG. 9.

FIG. 9 shows a schematic sectional view of another embodiment of a pressurized-gas storage container 7C for the vehicle 1. FIG. 10 shows a schematic sectional view of the pres-surized-gas storage container 7C along the sectional line X-X of FIG. 9. In the following, reference is made to FIGS. 9 and 10 simultaneously.

The design of the pressurized-gas storage container 7C essentially corresponds to the design of the pressurized-gas storage container 7A. Therefore, only the differences between the pressurized-gas storage containers 7A, 7C are discussed below. All aspects and features of the embodiments of the pressurized-gas storage container 7A, 7B explained above are applicable to the pressurized-gas storage container 7C. Conversely, all aspects and features of the pressurized-gas storage container 7C explained below are applicable to the different embodiments of the pressurized-gas storage container 7A, 7B.

The pressurized-gas storage container 7C comprises a gas guide apparatus 22 as mentioned above comprising a first gas guide element 23. In contrast to the pressurized-gas storage container 7A, the pressurized-gas storage container 7C does not comprise a second gas guide element 30, but a cooling canal 48 as described with reference to the pressurized-gas storage container 7B. Optionally, however, the pressurized-gas storage container 7C may also comprise a second gas guide element 30 as mentioned above, a gas guide tube 38 with gas guide ribs 43 to 46 as explained above and/or a gas guide section 47.

Figure 11:
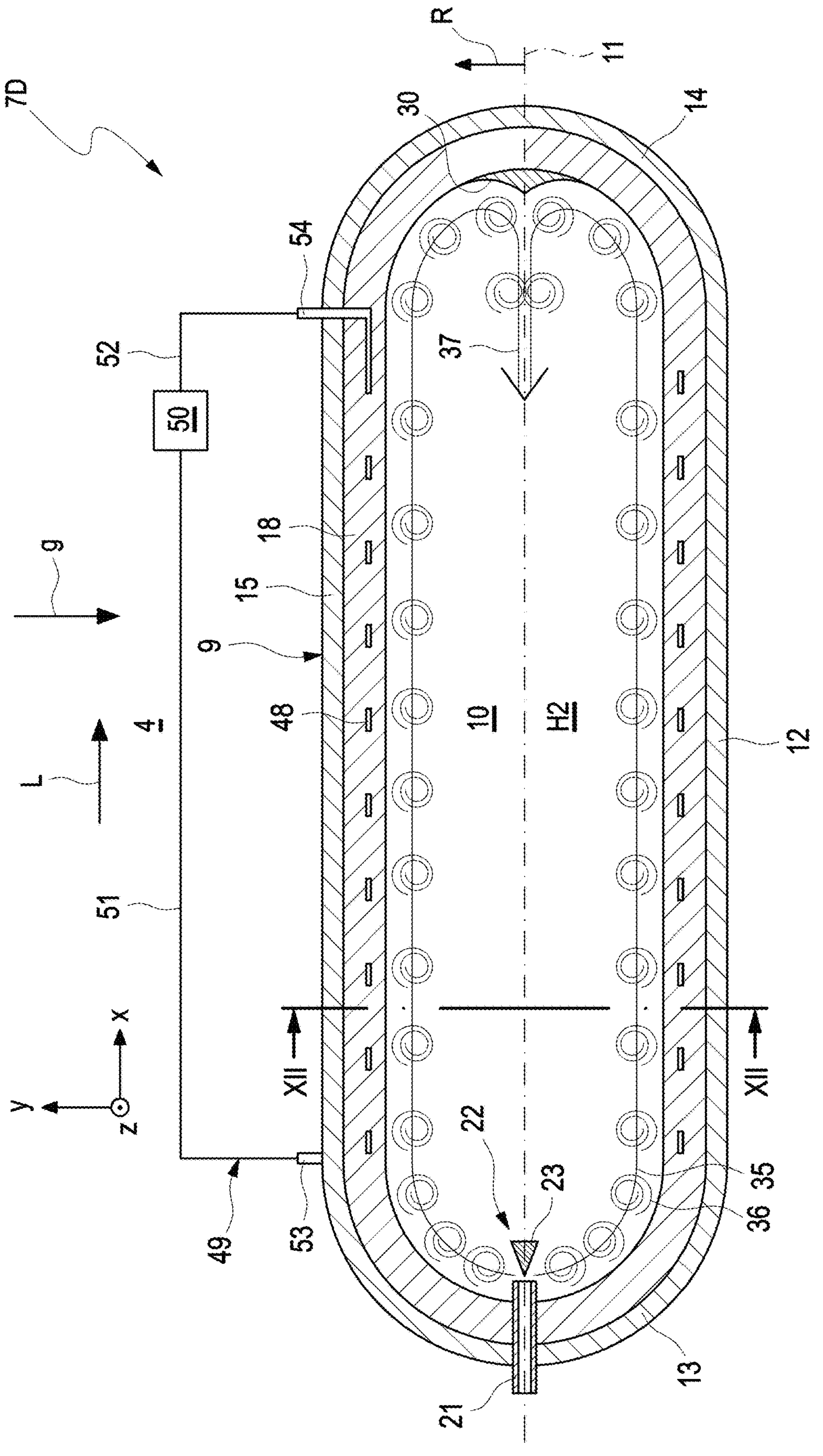
FIG. 11 shows a schematic sectional view of another embodiment of a pressurized-gas storage container for the vehicle according to FIG. 1.
Figure 12:
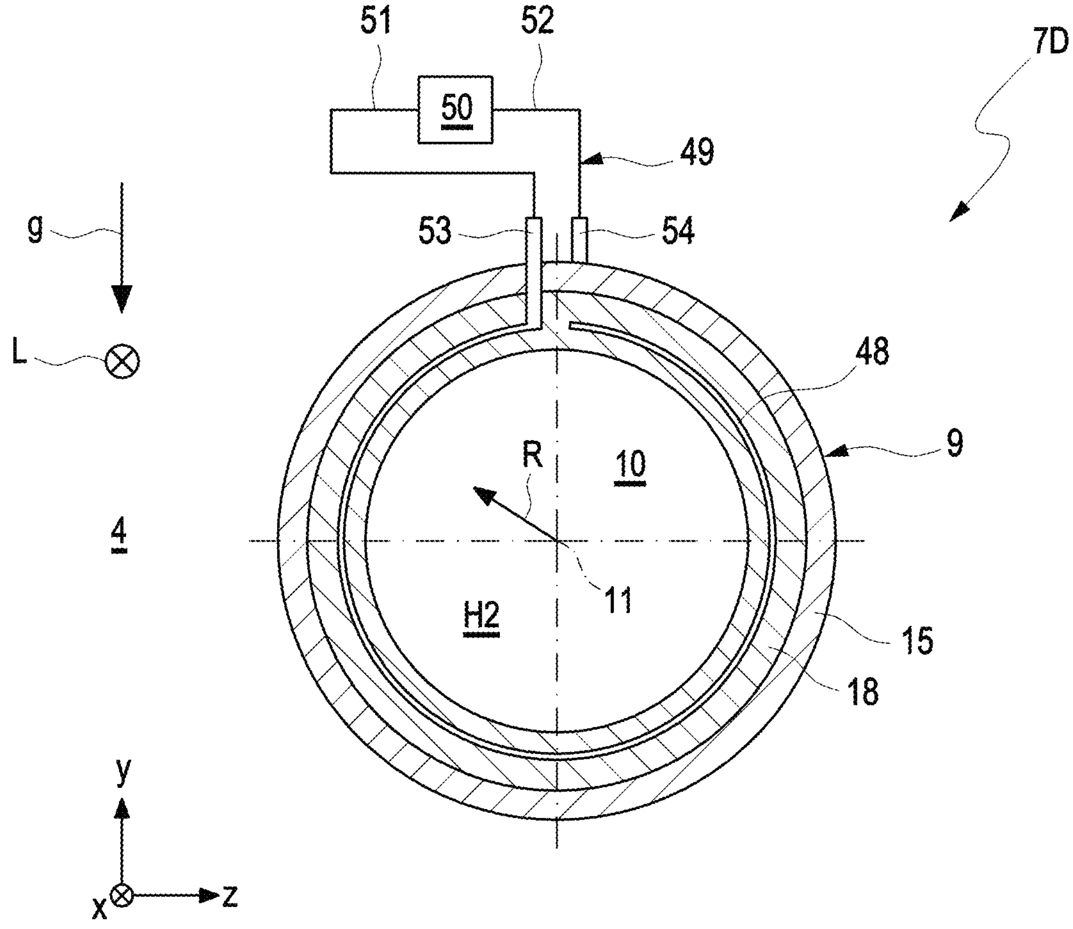
FIG. 12 shows a further schematic sectional view of the pressurized-gas storage container according to the sectional line XII-XII of FIG. 11.

FIG. 11 shows a schematic sectional view of another embodiment of a pressurized-gas storage container 7D. FIG. 12 shows a further schematic sectional view of the pressurized-gas storage container 7D according to the sectional line XII-XII of FIG. 11. In the following, reference is made to FIGS. 11 and 12 simultaneously.

In terms of its design, the pressurized-gas storage container 7D essentially corresponds to the design of the pressurized-gas storage container 7A. Therefore, only the differences between the pressurized-gas storage containers 7A, 7D are discussed below. All aspects and features of the embodiments of the pressurized-gas storage container 7A, 7B, 7C explained above are applicable to the pressurized-gas storage container 7D. Conversely, all aspects and features of the pressurized-gas storage container 7D explained below are applicable to the different embodiments of the pressurized-gas storage container 7A, 7B, 7C.

In contrast to the pressurized-gas storage container 7A, the pressurized-gas storage container 7D comprises an additional cooling canal 48 as mentioned above. The cooling canal 48 comprises an inlet 53 and an outlet 54, via which the hydrogen H2 can be supplied to and discharged from the cooling canal 48. Alternatively, another coolant or refrigerant can be used, which is passed through the cooling canal 48.

The inlet 53 and the outlet 54 protrude into the surroundings 4 and are thus accessible from the surroundings 4. The inlet 53 is provided at the first wall end section 13. The outlet 54 is provided at the second wall end section 14.

In particular, the hydrogen H2 flowing through the cooling canal 48 can be expanded directly into the receiving area 10. In this case, the hydrogen H2 is in particular not discharged with the aid of the outlet 54. For this purpose, a corresponding inlet or nozzle can be provided on the cooling canal 48. The hydrogen H2 fed through the cooling canal 48 is discharged into the cooling canal 48, in particular when the pressurized-gas storage container 7D is filled. Suitable valves or the like may be provided for this purpose. An additional supply of hydrogen H2 purely for cooling purposes can thus be dispensed with. The hydrogen H2 for filling the pressurized-gas storage container 7D can thus be used simultaneously for cooling the pres-surized-gas storage container 7D.

Alternatively, another coolant or refrigerant can be used instead of the hydrogen H2. For this purpose, a thermo module 50 as mentioned above can be fluidically connected to the inlet 53 and the outlet 54 by means of supply and/or discharge lines 51, 52 in order to form a refrigerant circuit 49 as mentioned above. A first supply and/or discharge line 51 may be connected to the inlet 53. Accordingly, a second supply and/or discharge line 52 may be connected to the outlet 54.

Figure 13:
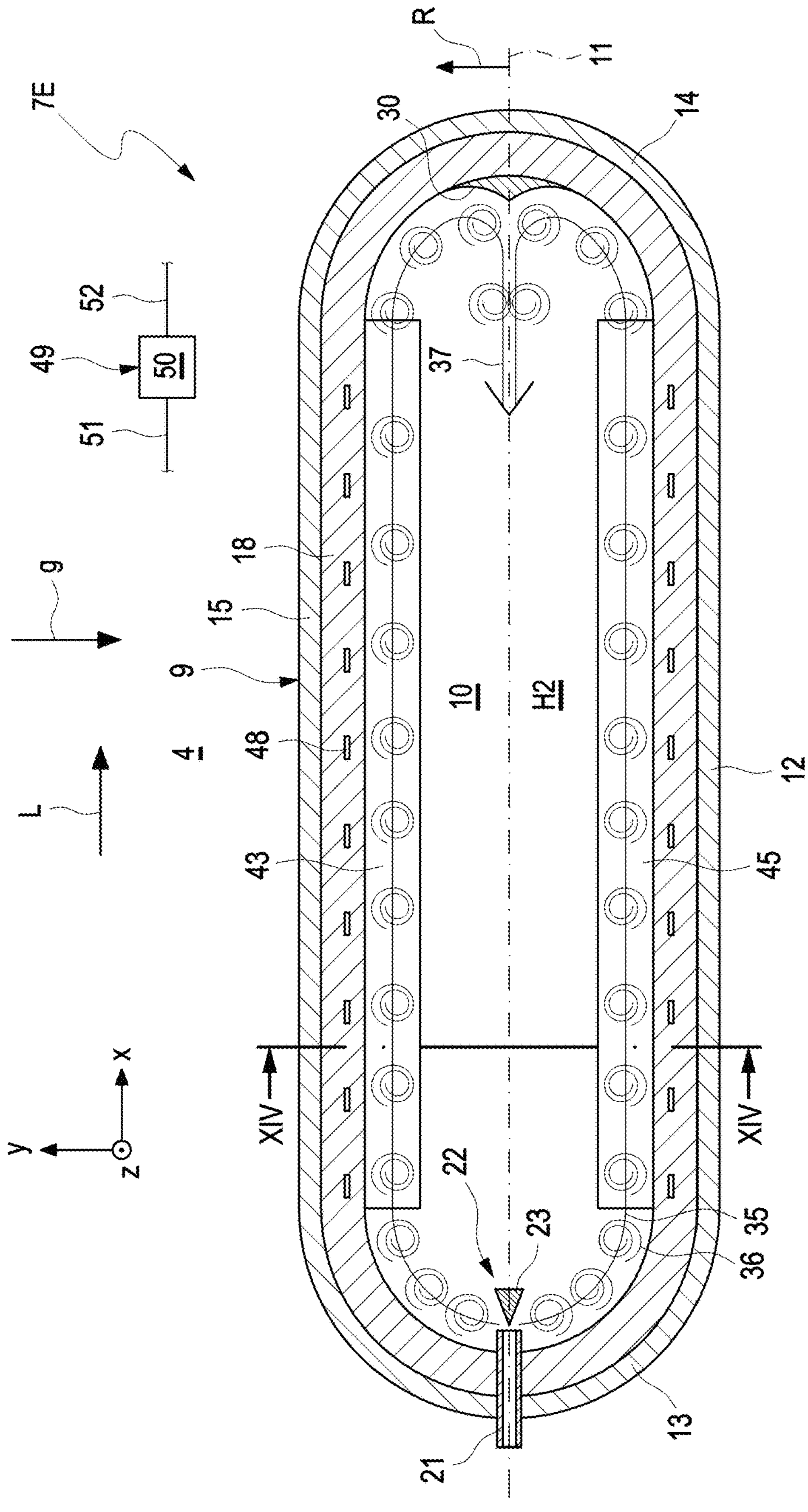
FIG. 13 shows a schematic sectional view of another embodiment of a pressurized-gas storage container for the vehicle according to FIG. 1.
Figure 14:
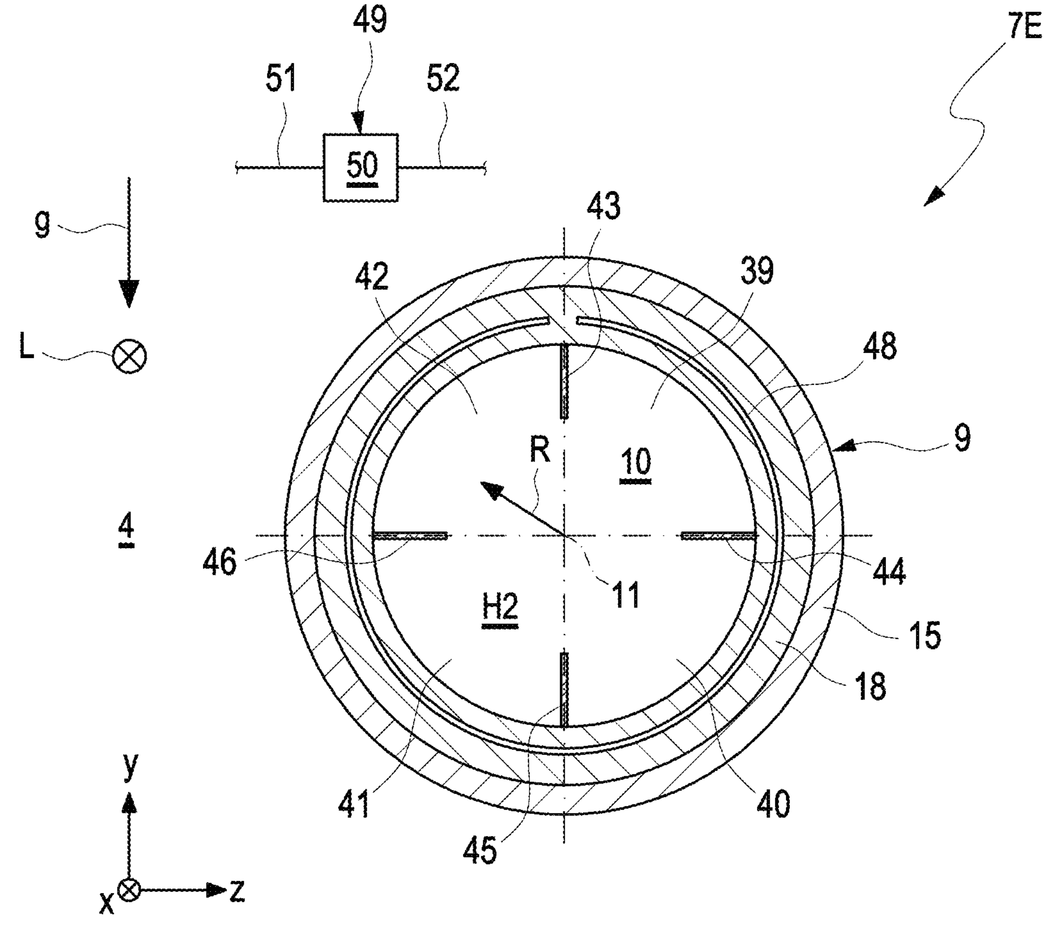
FIG. 14 shows a further schematic sectional view of the pressurized-gas storage container according to the sectional line XIV-XIV of FIG. 13.

FIG. 13 shows a schematic sectional view of another embodiment of a pressurized-gas storage container 7E for the vehicle 1. FIG. 14 shows a further schematic sectional view of the pressurized-gas storage container 7E according to the sectional line XIV-XIV of FIG. 13. In the following, reference is made to FIGS. 13 and 14 simultaneously.

In terms of its design, the pressurized-gas storage container 7E essentially corresponds to the design of the pressurized-gas storage container 7A. Therefore, only the differences between the pressurized-gas storage containers 7A, 7E are discussed below. All aspects and features of the embodiments of the pressurized-gas storage container 7A, 7B, 7C, 7D explained above are applicable to the pressurized-gas storage container 7E. Conversely, all aspects and features of the pressurized-gas storage container 7E explained below are applicable to the different embodiments of the pressurized-gas storage container 7A, 7B, 7C, 7D.

The pressurized-gas storage container 7E differs from the pressurized-gas storage container 7A essentially only in that the gas guide apparatus 22 comprises, in addition to the gas guide elements 23, 30, the gas guide ribs 43 to 46 explained with reference to the pressurized-gas storage container 7B. Optionally, the pressurized-gas storage container 7E may also comprise the aforementioned gas guide tube 38 with the gas guide section 47. However, this is not absolutely necessary.

As shown in FIG. 14, the gas guide ribs 43 to 46 divide the receiving area 10 into the aforementioned gas guide canals 39 to 42. In contrast to the pressurized-gas storage container 7B, the gas guide canals 39 to 42 are not closed here in the direction towards the middle axis 11 with the aid of the gas guide tube 38 but are open. In addition, the gas guide apparatus 22 of the pressurized-gas storage container 7E comprises a cooling canal 48 as mentioned above. The cooling canal 48 is optional.

Figure 15:
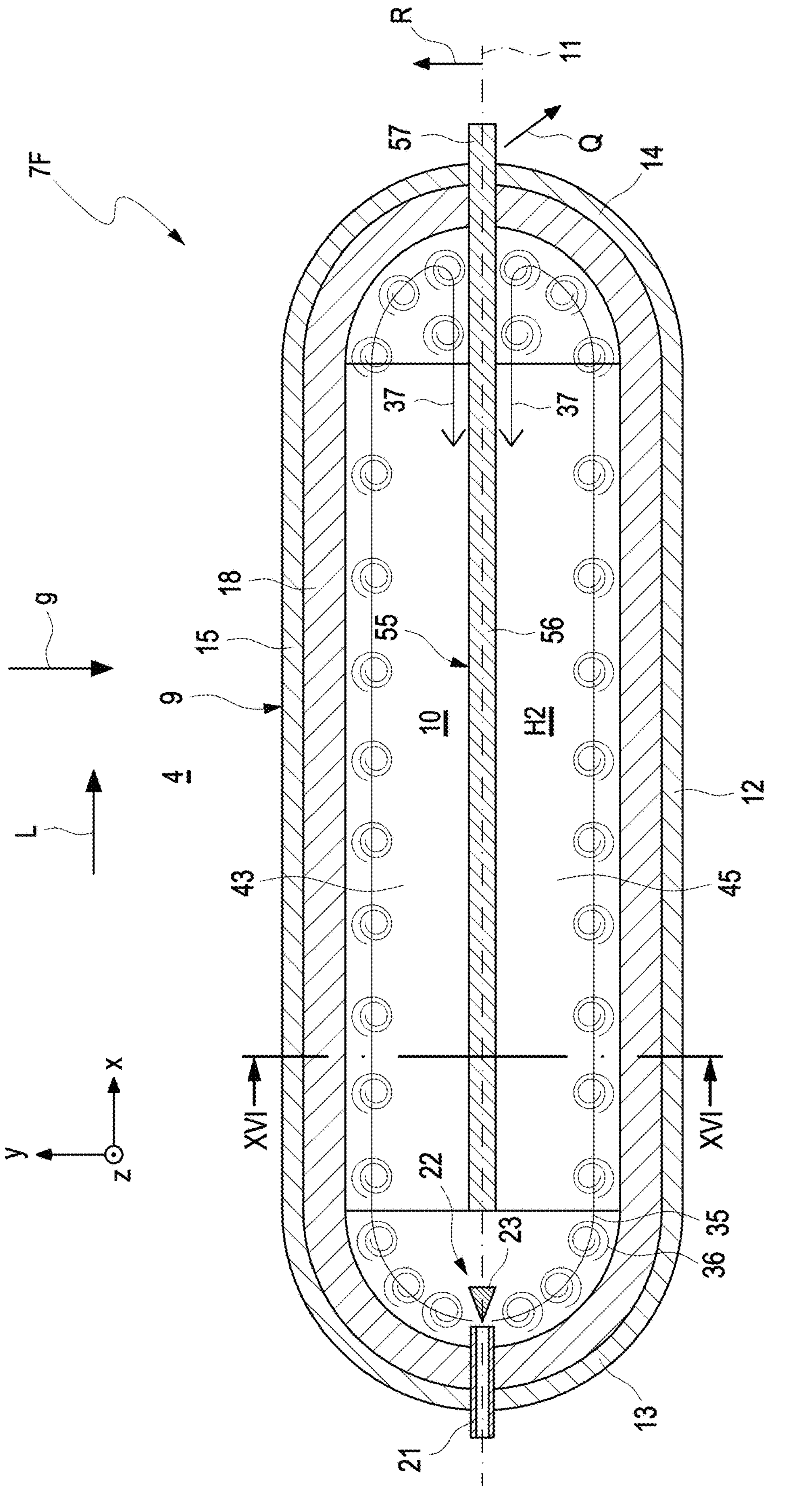
FIG. 15 shows a schematic sectional view of another embodiment of a pressurized-gas storage container for the vehicle according to FIG. 1.
Figure 16:
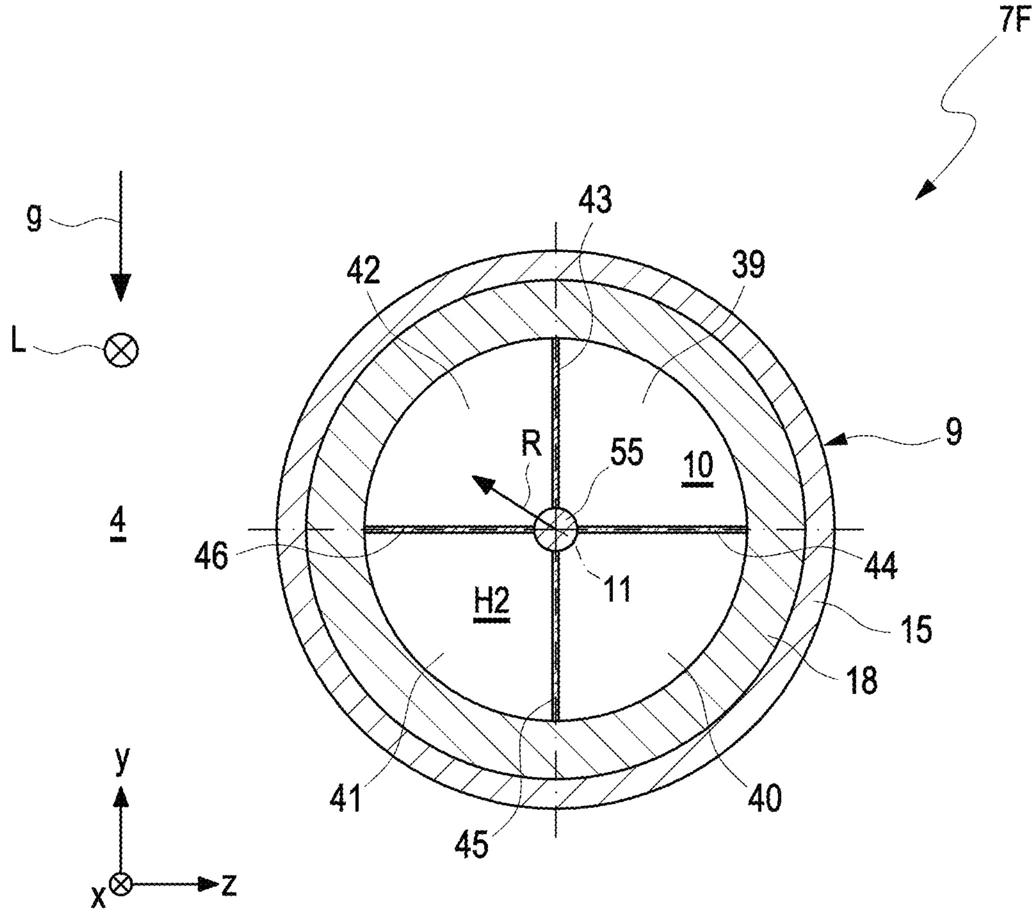
FIG. 16 shows another schematic sectional view of the pressurized-gas storage container according to sectional line XVI-XVI of FIG. 15.

FIG. 15 shows a schematic sectional view of another embodiment of a pressurized-gas storage container 7F. FIG. 16 shows a further schematic sectional view of the pressurized-gas storage container 7F along the sectional line XVI-XVI of FIG. 15. In the following, reference is made to FIGS. 15 and 16 simultaneously.

In terms of its design, the pressurized-gas storage container 7F essentially corresponds to the design of the pressurized-gas storage container 7A. Therefore, only the differences between the pressurized-gas storage containers 7A, 7F are discussed below. All aspects and features of the embodiments of the pressurized-gas storage container 7A, 7B, 7C, 7D, 7E explained above are applicable to the pressurized-gas storage container 7F. Conversely, all aspects and features of the pressurized-gas storage container 7F explained below are applicable to the different embodiments of the pressurized-gas storage container 7A, 7B, 7C, 7D, 7E.

In contrast to the pressurized-gas storage container 7A, the pressurized-gas storage container 7F does not comprise a second gas guide element 30. Alternatively, however, the pressurized-gas storage container 7F may also comprise a second gas guide element 30 as mentioned above. The gas guide apparatus 22 of the pressurized-gas storage container 7F comprises gas guide ribs 43 to 46 as previously mentioned, which in this case extend up to the middle axis 11.

The gas guide apparatus 22 further comprises a lance-shaped or rod-shaped heat discharge element 55, which is arranged centrally in the receiving area 10. This means that the heat discharge element 55 is preferably rotationally symmetrical with respect to the middle axis 11. The heat discharge element 55 comprises a basic section 56, which is arranged completely within the receiving area 10.

The basic section 56 extends along the longitudinal direction L from the first wall end section 13 to the second wall end section 14. The gas guide ribs 43 to 46 are connected to the basic section 56 in a thermally conductive manner. For example, the gas guide ribs 43 to 46 are bonded, soldered and/or welded to the basic section 56 of the heat discharge element 55. The gas guide ribs 43 to 46 hold the heat discharge element 55 in the center of the receiving area 10.

A heat delivery section 57 protrudes beyond the second wall end section 14 of the wall 9 and into the surroundings 4. Heat Q can thus be extracted from the hydrogen H2 introduced with the aid of the gas guide ribs 43 to 46 and discharged to the surroundings 4 via the heat discharge element 55. The heat delivery section 57 can be actively cooled to dissipate heat Q. A cooling system not shown can be provided for this purpose.

The heat discharge element 55 can be an integral component, in particular a one-piece material component. For example, the heat discharge element 55 can be made of an aluminum alloy, a copper alloy or stainless steel. However, any other materials can also be used. As previously mentioned, the heat discharge element 55 may be lance-shaped or rod-shaped. The heat discharge element 55 may therefore also be referred to as a heat dissipating lance or a heat dissipating rod.

The heat discharge element 55 can also be a heat pipe as explained above. This further improves the heat dissipation. In the event that the heat discharge element 55 is a heat pipe, the basic section 56 is a heating zone of the heat pipe, and the heat delivery section 57 is a cooling zone of the heat pipe. The terms "basic section" and "heating zone" can therefore be used interchangeably. The same applies to the terms "heat delivery section" and "cooling zone". Accordingly, the terms "heat discharge element" and "heat pipe" can also be used interchangeably.

Although the present invention has been described with reference to examples of embodiments, it can be modified in many ways.

LIST OF REFERENCE SIGNS

- 1 Vehicle
- 2 Car body
- 3 Vehicle interior
- 4 Surroundings
- 5 Wheel
- 6 Wheel
- 7 Pressurized-gas storage container
- 7A Pressurized-gas storage container
- 7B Pressurized-gas storage container
- 7C Pressurized gas storage container
- 7D Pressurized gas storage container
- 7E Pressurized gas storage container
- 7F Pressurized-gas storage container
- 8 Consumer
- 9 Wall
- 10 Receiving area
- 11 Middle axis

12 Basic section
13 Wall end section
14 Wall end section
15 Jacket
16 Outer side
17 Inner side
18 Liner
19 Outer side
20 Inner side
21 Inlet nozzle
22 Gas guide apparatus
23 Gas guide element
24 Middle axis
25 Outlet
26 Tip
27 End face
28 Jacket surface
29 End face
30 Gas guide element
31 Middle axis
32 Rear side
33 Front side
34 Tip
35 Gas stream
36 Vortex
37 Counter gas stream
38 Gas guide tube
39 Gas guide canal
40 Gas guide canal
41 Gas guide canal
42 Gas guide canal
43 Gas guide rib
44 Gas guide rib
45 Gas guide rib
46 Gas guide rib
47 Gas guide section
48 Cooling canal
49 Refrigerant circuit
50 Thermo module
51 Supply and/or discharge line
52 Supply and/or discharge line
53 Inlet
54 Outlet
55 Heat discharge element
56 Basic section
57 Heat delivery section
a Distance
g Direction of gravity
H2 Gas/Hydrogen
L Longitudinal direction
Q Heat
R Radial direction
x x-direction/Length direction
y y-direction/Height direction
z z-direction/Depth direction

The invention claimed is:

1. A pressurized-gas storage container for pressurized storage of a gas, comprising:

a wall enclosing and defining a receiving area configured to receive the gas, and a gas guide apparatus, configured to guide at least part of the gas along an inner side of the wall during filling of the receiving area with the gas, wherein the wall is configured as a heat exchanger to extract heat from the gas during the filling of the receiving area with the gas and to release the extracted heat to a surroundings of the pressurized-gas storage container, wherein the gas guide apparatus further comprises a gas guide tube which is arranged within the receiving area and is positioned coaxially with the wall defining at least one gas guide canal between the gas guide tube and the inner side of the wall, wherein a conical gas guide section is associated with the gas guide tube, wherein the conical gas guide section includes a tip positioned adjacent to an inlet nozzle and coaxially with the inlet nozzle, and wherein the conical gas guide section is firmly connected to the gas guide tube facing away from the tip.

2. The pressurized-gas storage container according to claim 1, wherein the wall comprises a middle axis extending from a first wall end section of the wall to a second wall end section facing away from the first wall end section, wherein the conical gas guide section and the gas guide tube direct the gas received from the inlet nozzle parallel to the middle axis through the at least one gas guide canal from the first wall end section of the wall toward the second wall end section of the wall during the filling of the receiving area.

3. The pressurized-gas storage container according to claim 1, wherein the gas guide apparatus further comprises at least one gas guide rib, which is arranged within the receiving area and extending parallel to a middle axis of the wall.

4. The pressurized-gas storage container according to claim 1, wherein the gas guide apparatus is configured as a thermal bridge between the receiving area and the surroundings to extract the heat from the gas and release it to the surroundings.

5. The pressurized-gas storage container according to claim 1, wherein the gas guide apparatus further comprises a cooling canal which is provided in or on the wall, the cooling canal is configured to allow at least a portion of the gas to flow through the cooling canal during the filling of the receiving area with the gas.

6. The pressurized-gas storage container according to claim 5, wherein the cooling canal is configured to expand the portion of the gas flowing through the cooling canal into the receiving area.

7. The pressurized-gas storage container of claim 1, wherein the gas comprises hydrogen gas.

8. The pressurized-gas storage container of claim 1, further comprising:

a first end wall section connected to a first end of the wall; and a second end wall section connected to a second end of the wall opposite the first end of the wall, wherein the inlet nozzle is connected to the first end wall section in communication with the receiving area defined by the wall.

9. The pressurized-gas storage container of claim 8, wherein the conical gas guide section comprises a first gas guide element, the conical gas guide section configured to deflect the gas exiting the inlet nozzle radially outward toward the inner side of the wall forming a gas stream through the at least one guide canal toward the second end wall section.

10. The pressurized-gas storage container of claim 9, further comprising a second gas guide element connected to the second wall end section in communication with the receiving area, the second gas guide element configured to receive the gas stream received from the at least one gas guide canal and divert the gas stream to form a counter gas stream directed toward the first end wall section in a direction opposite the gas stream.

11. The pressurized-gas storage container of claim 10, wherein the second gas guide element further comprises a front side in communication with the receiving area, the front side including two concave surfaces that converge to a tip positioned on a middle axis of the wall.

12. The pressurized-gas storage container of claim 10, wherein the gas guide tube defines an internal canal positioned along a middle axis of the wall, wherein the counter gas stream is directed into the internal canal.

13. The pressurized-gas storage container of claim 1, comprising a middle axis of the wall extending from a first wall end section of the wall to a second wall end section of the wall, wherein the conical gas guide section is positioned along the middle axis facing away from the first wall end section.

14. The pressurized-gas storage container of claim 13, wherein the conical gas guide section is configured to redirect the gas exiting the inlet nozzle radially outward toward the inner side of the wall, through the at least one gas guide canal, and along the inner side of the wall parallel to the middle axis, during the filling of the receiving area with the gas to release the extracted heat through the wall as the heat exchanger to the surroundings.

15. The pressurized-gas storage container of claim 9, comprising a middle axis of the wall extending from the first end wall section to the second end wall section, wherein the first gas guide element including the tip is positioned along the middle axis, wherein the gas stream is directed through the at least one guide canal, along the inner side of the wall parallel to the middle axis, to release the extracted heat through the wall as the heat exchanger to the surroundings.

16. A pressurized-gas storage container for pressurized storage of a gas, comprising:

a wall enclosing and defining a receiving area configured to receive the gas, the wall comprising:

a liner having an inner side facing the receiving area;

a jacket surrounding the liner;

a first wall end section;

a second wall end section facing away from the first wall end section; and a middle axis extending from the first wall end section to the second wall end section;

an inlet nozzle in communication with the a surroundings of the wall and the receiving area, the inlet nozzle having an end face positioned in the receiving area;

a gas guide apparatus comprising:

a gas guide tube arranged within the receiving area and positioned coaxially with the inner side of the liner and the middle axis;

at least one gas guide rib connected to the gas guide tube and the inner side of the liner and extending parallel to the middle axis between the first wall end section and the second wall end section, wherein the gas guide tube, the at least one gas guide rib, and the inner side of the liner defining at least one gas guide canal; and a conical gas guide section positioned along the middle axis and connected to the gas guide tube, the conical gas guide section having a tip positioned adjacent to the end face of the inlet nozzle, wherein the conical gas guide section is configured to redirect the gas exiting the inlet nozzle radially outward toward the inner side of the liner forming a gas stream, wherein the gas stream is directed through the at least one gas guide canal, and along the inner side of the liner parallel to the middle axis, during a filling of the receiving area with the gas to release extracted heat to the surroundings through the wall as a heat exchanger.

17. The pressurized-gas storage container of claim 16, wherein the gas guide apparatus comprises:

a second gas guide element connected to the second wall end section in communication with the receiving area, the second gas guide element comprising a front side in communication with the receiving area, the front side including two concave surfaces that converge to a tip of the second gas guide element that is positioned on the middle axis of the wall, the second gas guide element configured to receive the gas stream from the at least one guide canal and divert the gas stream to form a counter gas stream directed toward the first wall end section along the middle axis in a direction opposite the gas stream.

18. The pressurized-gas storage container of claim 5, wherein the cooling canal is an integral part of the wall and extends in a helical manner about a middle axis and parallel to the middle axis between a first wall end section of the wall and a second wall end section of the wall.

19. The pressurized-gas storage container of claim 18, wherein the cooling canal defines a cavity in the wall and is enclosed by the wall.

* * * * *